(12) United States Patent
Takahashi

(10) Patent No.: US 7,394,579 B2
(45) Date of Patent: Jul. 1, 2008

(54) DATA WRITING APPARATUS AND IMAGE PROCESSING APPARATUS

(75) Inventor: Osamu Takahashi, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1015 days.

(21) Appl. No.: 10/618,626

(22) Filed: Jul. 15, 2003

(65) Prior Publication Data

US 2004/0012829 A1   Jan. 22, 2004

(30) Foreign Application Priority Data

Jul. 17, 2002   (JP) .............................. 2002-208448

(51) Int. Cl.
  *H04N 1/04* (2006.01)
(52) U.S. Cl. .................. 358/483; 358/482; 358/443; 358/444; 358/445; 358/403; 358/450
(58) Field of Classification Search ............... 358/404, 358/403, 482, 483, 474, 497, 486, 443–445, 358/512–514, 505, 506, 487, 450, 524, 498; 250/208.1, 216, 234–236; 348/294, 298, 348/272, 276, 322, 323, 231.99, 231.2
See application file for complete search history.

(56) References Cited

U.S. PATENT DOCUMENTS 5,767,901 A    6/1998   Kimura

2002/0145675 A1   10/2002   Yoshihara et al.

FOREIGN PATENT DOCUMENTS

| JP | A 63-52571 | 3/1988 |
|----|-----------|--------|
| JP | A 9-9001 | 1/1997 |
| JP | A 2001-103238 | 4/2001 |
| JP | A 2002-185699 | 6/2002 |

*Primary Examiner*—Cheukfan Lee
(74) *Attorney, Agent, or Firm*—Oliff & Berridge, PLC

(57) ABSTRACT

An image reading apparatus of the present invention converts respective pixel signals outputted from first, second and third shift registers to pixel data in an analog frontend IC and outputs pixel data as a serial data stream in a predetermined pattern. The address setting unit repeats add and subtract operation to the initial value according to the output pattern of the pixel data from the analog frontend IC to calculate pixel positions of the respective pixel data, and sets memory addresses corresponding to the pixel positions as destination memory addresses of the pixel data in an address register RR. The memory writing control unit writes the pixel data obtained from the analog frontend IC via a data sampling control unit in areas in the memory which correspond to the destination memory addresses. As a result, the amount of memory necessary for storing the pixel data can be reduced, and sorting operation of the pixel data can be executed with fewer memory access times.

6 Claims, 16 Drawing Sheets

FIG. 15A

| LOWER ADDRESS → | 00 | 01 | 02 | 03 | 04 | 05 | 06 | 07 | 08 | 09 | 0a | 0b |
|---|---|---|---|---|---|---|---|---|---|---|---|---|
| 0x05 | (5,1) | (5,3) | (0,2) | (5,5) | (5,7) | (0,4) | (5,9) | (5,11) | (0,6) | (5,13) | (5,15) | (0,8) |
| 0x06 | (6,1) | (6,3) | (1,2) | (6,5) | (6,7) | (1,4) | (6,9) | (6,11) | (1,6) | (6,13) | (6,15) | (1,8) |
| 0x07 | (7,1) | (7,3) | (2,2) | (7,5) | (7,7) | (2,4) | (7,9) | (7,11) | (2,6) | (7,13) | (7,15) | (2,8) |
| 0x08 | (8,1) | (8,3) | (3,2) | (8,5) | (8,7) | (3,4) | (8,9) | (8,11) | (3,6) | (8,13) | (8,15) | (3,8) |
| 0x09 | (9,1) | (9,3) | (4,2) | (9,5) | (9,7) | (4,4) | (9,9) | (9,11) | (4,6) | (9,13) | (9,15) | (4,8) |
| 0x0a | (10,1) | (10,3) | (5,2) | (10,5) | (10,7) | (5,4) | (10,9) | (10,11) | (5,6) | (10,13) | (10,15) | (5,8) |
| 0x0b | (11,1) | (11,3) | (6,2) | (11,5) | (11,7) | (6,4) | (11,9) | (11,11) | (6,6) | (11,13) | (11,15) | (6,8) |

↑ HIGHER ADDRESS

FIG. 15B

| HIGHER ADDRESS | | | | | | | | | | | | | | | | |
|---|---|---|---|---|---|---|---|---|---|---|---|---|---|---|---|---|
| 0x05- | 00 | | 02 | 03 | | 05 | 06 | | 08 | 09 | | 0b | | | | |
| 0x0a- | | 01 | | | 04 | | | 07 | | | 0a | | | | | |
| 0x05- | | | | | | | | | | | | | 0e | | | |
| ADDRESS REGISTER Rc1 | Rc1 | | Rc2 | Rc3 | | Rc2 | Rc1 | | Rc2 | Rc1 | | Rc3 | | | | |
| ADDRESS REGISTER Rc2 | | | | | | | | | | | | | | | | |
| ADDRESS REGISTER Rc3 | | | | | | | | | | | | | | | | |
| READ-OUT PIXEL DATA | (5,1) | (5,2) | (5,3) | (5,4) | (5,5) | (5,6) | (5,7) | (5,8) | (5,9) | (5,10) | (5,11) | | | | | |

DATA WRITING APPARATUS AND IMAGE PROCESSING APPARATUS

BACKGROUND OF THE INVENTION i) Technical Field of the Invention

This invention relates to an image reading apparatus that reads an image using an image sensor.

ii) Description of the Related Art

Conventionally, there are known image reading apparatuses that read an image from an original copy using a monochrome or color image sensor to generate monochrome or color image data. Such image reading apparatuses are incorporated, for example, in copying machines, fax machines and scanners.

These image reading apparatuses generally allow the user to input a command from an operating portion of a user interface to switch resolution modes between high and low. The low resolution mode is selected to output image data in low resolution, and high resolution mode is selected to output image data in high resolution. According to a command signal generated from the user output, the image reading apparatuses are made to operate in one of the resolution modes.

An example of conventional apparatuses having a plurality of modes is an apparatus that obtains image data in high resolution from an image sensor and generates image data in low resolution by skipping pixels which constitute the image data in high resolution.

Another example is an image reading apparatus which comprises an image sensor including a sensor having a plurality of light receiving elements in a primary scanning direction, a shift register for outputting respective pixel signals obtained from the light receiving elements arranged at even-numbered positions and another shift register for outputting respective pixel signals obtained from the light receiving elements arranged at odd-numbered positions among the light receiving elements constituting the sensor. The image reading apparatus generates image data in high resolution by using output signals from both of the shift registers when the high resolution mode is selected, and generates image data in low resolution (particularly, half of the resolution in the high resolution mode) by using output signals from one of the shift registers when the low resolution mode is selected.

However, a conventional image reading apparatus of the former example which lowers the resolution by pixel skipping involves a problem that the image reading speed of the image sensor is not improved even in the low resolution mode. Therefore, the advantage in lowering the resolution cannot be fully obtained. A conventional image reading apparatus of the latter example provided with two shift registers also involves a problem that the needs of users who demand a wide variety of choices of resolutions cannot be fully satisfied since the choices are only two, although the processing speed can be effectively improved in the low resolution mode.

The inventors of the present invention devised an image reading apparatus by providing a conventional image reading apparatus of the latter example with an additional sensor and an additional shift register (see FIG. 2).

Such an image reading apparatus is advantageous since the resolution can be switched among three resolutions by combining two sensors, and three shift registers, and the image processing speed may be improved depending on the selected resolution.

For example, when each sensor is set to read with a resolution of 600 dpi in the primary scanning direction, the image reading apparatus as above can generate image data with a resolution of 1200 dpi by using all the signals obtained from the three shift registers, generate image data with a resolution of 600 dpi by using the signals obtained from the additional shift register, and generate image data with a resolution of 300 dpi by using the signals obtained from the shift register for outputting the respective light reception signals of the light receiving elements arranged at even-numbered (or odd-numbered) positions.

In the image reading apparatus as above, however, the order of the pixel signals obtained from the image sensor does not coincide with the order of arrangement of the light receiving elements in the primary scanning direction as shown in FIG. 3, and a difference therebetween is widened as time goes by. Therefore, after sequential conversion of the pixel signals obtained from the image sensor to pixel data as digital signals, it is necessary to sort the pixel data in their original order. Number with brackets shown in FIG. 3 represent light receiving positions of light receiving elements in the primary scanning direction which correspond to pixel signals.

In other words, if the sorting operation is performed after all the pixel data are stored in a memory once, areas for both storing all the pixel data before and after the sorting are necessary. Therefore, the amount of memory required is increased. Furthermore, if such a technique is adopted, access times to the memory during the sorting operation are increased, and thus, the processing speed of the overall image reading apparatus is lowered.

SUMMARY OF THE INVENTION

An object of the present invention, which has been made to solve these problems, is to reduce the amount of memory required for storing pixel data outputted from an image reading apparatus that reads an image using an image sensor including three shift registers, and to allow sorting of the pixel data with reduced memory access times.

In order to attain the above object, the present invention provides a data writing apparatus in a following image reading apparatus. The image reading apparatus comprises a first sensor, a second sensor, a first outputting device, a second outputting device, and a third outputting device. The first sensor includes light receiving elements provided per pixel and arranged in a primary scanning direction, and the second sensor includes light receiving elements provided per pixel, arranged in a primary scanning direction and disposed in parallel to and at a predetermined distance away from the first sensor in a secondary scanning direction. The first outputting device outputs respective pixel signals obtained from the respective light receiving elements constituting the first sensor in order of arrangement of the light receiving elements. The second outputting device outputs respective pixel signals obtained from the respective light receiving elements at even-numbered positions among the light receiving elements constituting the second sensor in order of arrangement of the light receiving elements. The third outputting device outputs respective pixel signals obtained from the respective light receiving elements among the light receiving elements at odd-numbered positions constituting the second sensor in order of arrangement of the light receiving elements. The data writing apparatus comprises a pixel data outputting device, a calculating device, address setting device, and a writing device.

The pixel data outputting device converts the respective pixel signals outputted from the first, second and third outputting devices to the aforementioned pixel data, and outputs the pixel data as a serial data stream in a predetermined pattern.

The calculating device repeats add and subtract operation to a predetermined initial value according to the output pattern of the pixel data from the pixel data outputting device to calculate pixel positions of the respective pixel data outputted from the pixel data outputting device. The address setting device sets destination memory addresses to which the pixel data outputted from the pixel data outputting device are written based on the calculation results by the calculating device. The writing device writes the pixel data outputted from the pixel data outputting device to areas in the data storage memory which correspond to the destination memory addresses set by the address setting device.

According to the data writing apparatus constituted as above, the pixel positions of the pixel data outputted from the pixel data outputting device are calculated by the calculating device, and the pixel data are written to the areas in the data storage memory which correspond to the pixel positions. Therefore, it is possible to perform sorting and writing of the pixel data at the same time to store the pixel data in the data storage memory in their original order. Accordingly, there is no need to secure an additional area necessary for the sorting in the data storage memory any longer.

In addition, in this data writing apparatus, since the sorting can be performed simultaneously with writing of the pixel data, the sorting can be completed with fewer memory access times, compared to a case in which the sorting of pixel data is performed after the pixel data are stored in the data storage memory once. Accordingly, if the data writing apparatus of the present invention is incorporated in an image reading apparatus and shares a CPU, memory, etc., the overall workload of the image reading apparatus can be reduced, and decline in processing speeds of various components in the image reading apparatus can be avoided.

In the data writing apparatus, the calculating device includes a difference calculating unit that calculates a difference between the pixel position of the pixel data to be outputted from the pixel data outputting device and the pixel position of the pixel data outputted last time. The address setting device includes an address storing unit that stores the destination memory address, and updates the destination memory address based on the difference calculated by the difference calculating unit and the address stored in the address storing unit.

With respect to the pixel positions of the pixel data outputted from the pixel data outputting device, there are certain patterns which are different in the first, second and third outputting devices. Thus the pixel positions can be obtained by easy calculations per outputting device. Accordingly, it is preferable that the aforementioned calculating device is particularly constituted as below.

The calculating device in the data writing apparatus comprises a first calculating device, a second calculating device, and a third calculating device. The first calculating device repeats add and subtract operation to a predetermined first initial value to sequentially calculate pixel positions of the pixel data corresponding to the pixel signals outputted from the first outputting device. The second calculating device repeats add and subtract operation to a predetermined second initial value to sequentially calculate pixel positions of the pixel data corresponding to the pixel signals outputted from the second outputting device. The third calculating device repeats add and subtract operation to a predetermined third initial value to sequentially calculate pixel positions of the pixel data corresponding to the pixel signals outputted from the third outputting device. The calculating device outputs one of the calculation results obtained from the first, second and third calculating devices as a calculation result of the calculating device, depending on the output pattern of the pixel data obtained from the pixel data outputting device.

With the aforementioned data writing apparatus, the pixel positions of the pixel data corresponding to the respective pixel signals from the first, second and third outputting devices can be calculated by the respective calculating devices. Therefore, the calculations of pixel positions become easier compared to a case in which the pixel positions of all the pixel data are calculated by a single common calculating device. It is also advantageous for the designer since designing of the calculating device becomes simple.

In a typical memory (such as DRAM), data can be written per several bytes at a time. Therefore, in the above data writing apparatus, it is preferable that the writing device is constituted as below.

The writing device in the data writing apparatus comprises a first FIFO memory and a second FIFO memory. The first FIFO memory stores the pixel data corresponding to the pixel signals obtained from the first sensor among the pixel data outputted from the pixel data outputting device, and the second FIFO memory stores the pixel data corresponding to the pixel signals obtained from the second sensor among the pixel data outputted from the pixel data outputting device. The writing device can write a plurality of pixel data stored in the respective memories in a lump to the aforementioned data storage memory.

In the above data writing apparatus, the first and second FIFO memories are provided. This is because, due to the distance between the first and second sensors in the secondary scanning direction, the pixel positions of the pixel data corresponding to the pixel signals obtained from the first sensor do not coincide with the pixel positions of the pixel data corresponding to the pixel signals obtained from the second sensor.

By providing two FIFO memories, it is possible to write the pixel data in a lump to the areas in the data storage memory corresponding to the respective pixel positions since there is not a huge difference between the pixel positions of the pixel data in the respective FIFO memories. According to the above data writing apparatus, the memory access times required for writing the pixel data can be reduced.

It is preferable that the writing device in the data writing apparatus is particularly constituted as below.

The writing device of the data writing apparatus accesses the areas in the data storage memory which correspond to the destination memory addresses set by the aforementioned address setting device using byte enable signal to write a plurality of pixel data to the areas in a lump. Use of the byte enable signal allows writing the plurality of pixel data in a lump to the memory areas corresponding to the pixel positions, and thus memory access times can be reduced.

Another aspect of the present invention is to provide an image processing apparatus for making an external image forming apparatus to form an image based on a group of pixel data written to a memory by an image reading apparatus. The image reading apparatus comprises a first sensor, a second sensor, a first outputting device, a second outputting device, a third outputting device, a pixel data outputting device, and a writing device. The first sensor includes light receiving elements provided per pixel and arranged in a primary scanning direction, and the second sensor includes light receiving elements provided per pixel, arranged in the primary scanning direction and disposed in parallel to and at a predetermined distance away from the first sensor in a secondary scanning direction. The first outputting device outputs respective pixel signals obtained from the respective light receiving elements constituting the first sensor in order of arrangement of the light receiving elements. The second outputting device outputs respective the pixel signals obtained from the respective light receiving elements at even-numbered positions among the light receiving elements constituting the second sensor in order of arrangement of the light receiving elements. The third outputting device outputs respective pixel signals obtained from the respective light receiving elements at odd-numbered positions among the light receiving elements constituting the second sensor in order of arrangement of the light receiving elements. The pixel data outputting device converts the pixel signals outputted from the first, second and third outputting devices to the pixel data as digital signals and outputs the pixel data as a serial data stream in a predetermined pattern. The writing device sequentially writes the respective pixel data outputted from the pixel data outputting device to the memory. The image processing apparatus comprises a restoration outputting device that reads and outputs the respective pixel data from the memory in the order corresponding to the pixel arrangement of the image to be formed by the external image forming apparatus based on the output pattern of the pixel data from the pixel data outputting device.

According to the above image processing apparatus, sorting of the pixel data and reading of pixel data from the memory when the pixel data is transmitted to the image forming apparatus can be performed simultaneously. Therefore, it is not necessary to secure an additional area in the memory required for the sorting operation any longer.

Concurrent execution of reading and sorting of the pixel data allows reduction of memory access times. accordingly, if the image processing apparatus of the present invention is incorporated in an image reading apparatus to share a CPU, memory, etc., it is possible to avoid decline in the processing speed of the image reading apparatus.

BRIEF DESCRIPTION OF THE DRAWING

The invention will now be described, by way of example, with reference to the accompanying drawings, which:

FIG. 15A is an explanatory view showing an arrangement of the pixel data written to the memory in the third modification, and FIG. 15B is an explanatory view showing the order of reading the pixel data.

DETAILED DESCRIPTION OF PREFERRED EMBODIMENT

Figure 1:
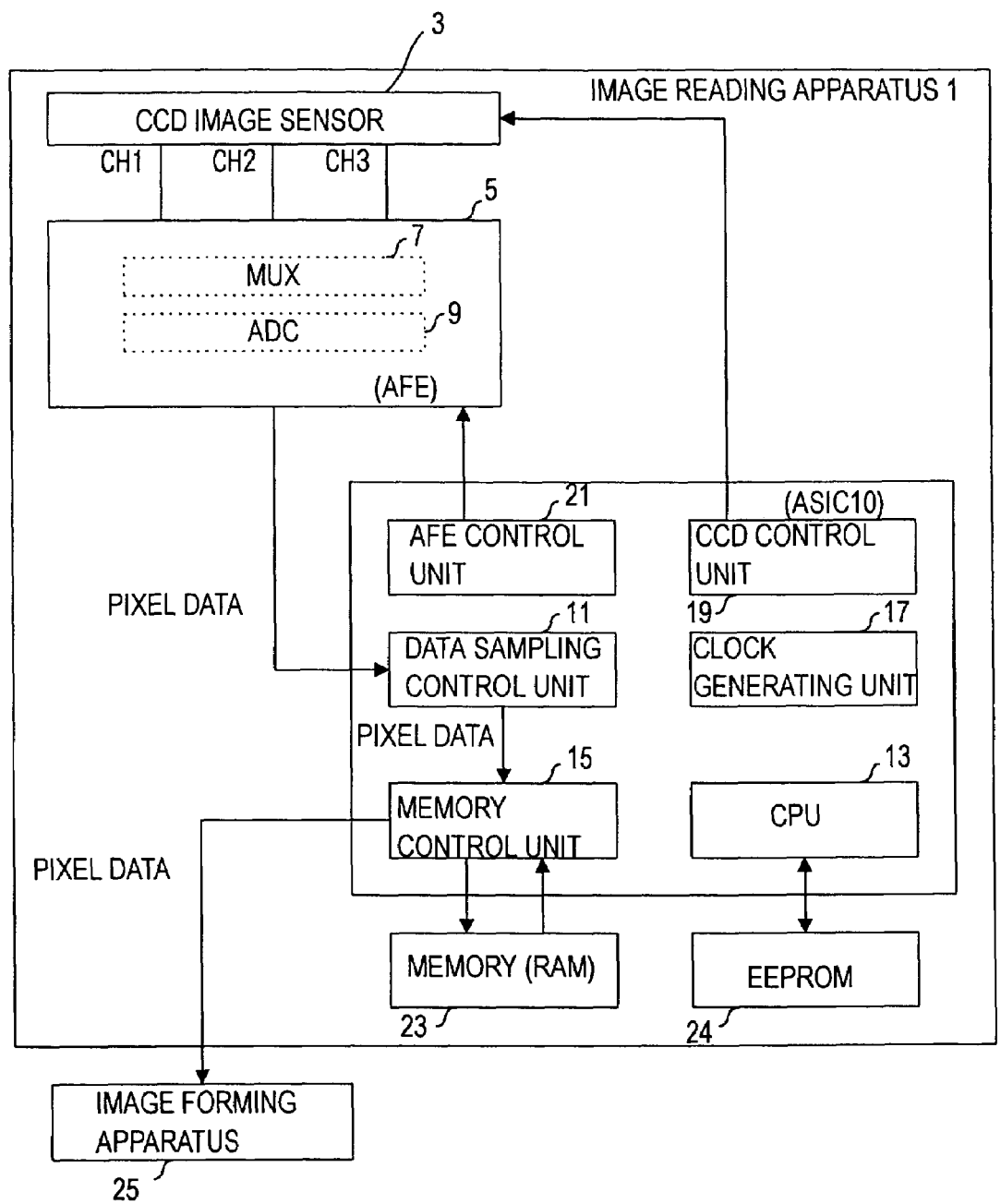
FIG. 1 is a schematic block diagram showing the constitution of an image reading apparatus according to the present embodiment.

Referring to FIG. 1, the image reading apparatus 1 according to the present embodiment is provided with a CCD (Charge Coupled Device) image sensor 3 and an analog frontend (AFE) IC 5. It reads an image from an original copy using the CCD image sensor 3 and provides pixel signals outputted from respective channels (CH1, CH2, CH3) of the CCD image sensor 3 during the image reading to the analog frontend IC 5.

The image reading apparatus 1 sequentially provides the pixel signals of the respective channels obtained from the CCD image sensor 3 to an analog/digital converter (ADC) 9 in a predetermined pattern using a multiplexer (MUX) 7 in the analog frontend IC 5, converts the pixel signals of the respective channels to pixel data as digital signals, and then provides the pixel data from the analog frontend IC 5 to a data sampling control unit 11 in an ASIC 10 as a serial data stream in a predetermined pattern which corresponds to the operation of the multiplexer 7.

In the ASIC 10, a CPU 13 for comprehensively controlling the image reading apparatus 1, a memory control unit 15, a clock generating unit 17, a CCD control unit 19 and an AFE control unit 21 are built-in in addition to the aforementioned data sampling control unit 11. A memory 23 (i.e. a RAM) for storing pixel data and an EEPROM 24 for storing a variety of setting information about the image reading apparatus 1 are provided outside the ASIC 10.

The data sampling control unit 11 removes pixel data unnecessary to be stored in the memory 23 from among the pixel data which are outputted from the analog frontend IC 5, and provides the remaining pixel data to the memory control unit 15.

The memory control unit 15, designed to control writing and reading of pixel data, sequentially writes the pixel data received from the data sampling control unit 11 to predetermined areas of the memory 23. It also reads out the pixel data stored in the memory 23 according to a command from the CPU 13 and outputs the read-out data to an external image forming apparatus 25 (details are explained later).

The clock generating unit 17 is designed to generate a reference clock signal for actuating the respective components in the CCD image sensor 3, analog frontend IC 5 and ASIC 10 synchronously. The CCD control unit 19 is designed to generate transfer clock signals $\phi1$, $\phi2$, a resetting signal RS, a gate signal SH based on the reference clock signal obtained from the clock generating unit 17, and controls driving of the CCD image sensor 3 using the generated signals. The AFE control unit 21 is designed to provide the analog frontend IC 5 with various settings to perform offset adjustment and gain adjustment.

Figure 2:
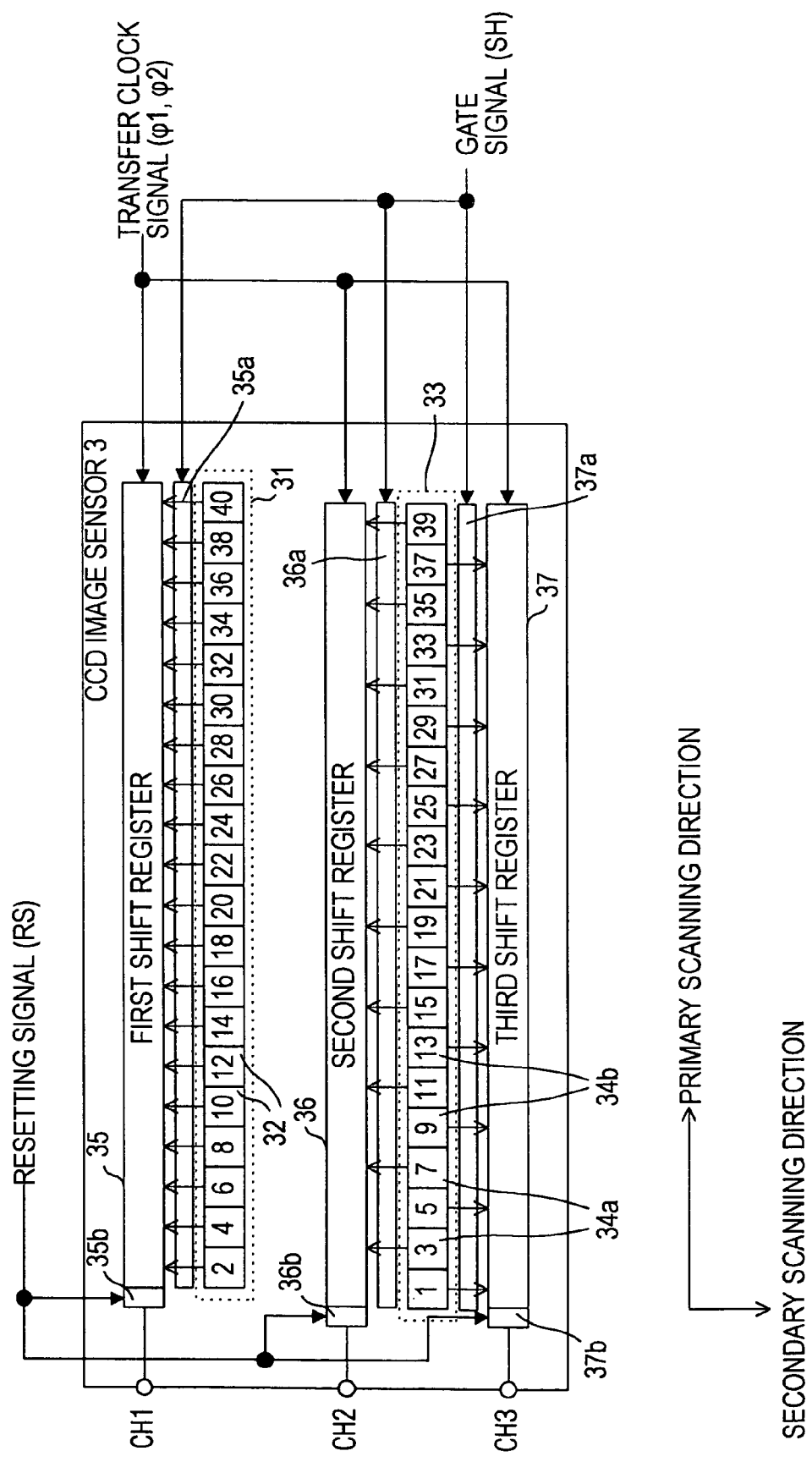
FIG. 2 is an explanatory view showing the schematic constitution of a CCD image sensor.

The CCD image sensor 3 driven and controlled by the aforementioned CCD control unit 19 is constituted particularly as shown in FIG. 2. FIG. 2 is an explanatory view schematically showing an internal constitution of the CCD image sensor 3. Numbers shown in the respective light receiving elements 32, 34a, 34b in FIG. 2 represent light receiving positions in the primary scanning direction (i.e. pixel positions).

The CCD image sensor 3 of the present embodiment comprises a first sensor 31, a second sensor 33, a first shift register 35, a second shift register 36 and a third shift register 37. The CCD image sensor 3 serves as a so-called monochrome CCD image sensor.

The first sensor 31 has a plurality of light receiving elements 32 (i.e. photo diodes) arranged in a primary scanning direction. The second sensor 33 has a plurality of light receiving elements 34a, 34b (i.e. photo diodes) arranged in the primary scanning direction, and is disposed in parallel with and at a predetermined distance (e.g. 5 lines) away from the first sensor 31 in a secondary scanning direction. The respective light receiving elements 34a, 34b constituting the second sensor 33 have respective light receiving positions that are set to be at a predetermined distance away from the first sensor 31 in the secondary scanning direction and between the respective light receiving elements 32 constituting the first sensor 31 (that is, positions shifted by half a pixel). In other words, the light receiving elements 32, 34a, 34b in the CCD image sensor 3 are mutually shifted by half a pixel, from the start end toward the terminal end of the primary scanning direction, to give a so-called staggered (pixel) arrangement.

The first to third shift registers 35, 36, 37 are known two-phase drive CCD shift registers. Particularly, the first shift register 35 obtains the respective pixel signals (i.e. signal charges) outputted from the respective light receiving elements 32 constituting the first sensor 31 provided per pixel as the result of receiving light through a shift gate 35. It then transfers the respective pixel signals to an output end of the first shift register 35 according to the transfer clock signals φ1, φ2 from the CCD control unit 19, and outputs the pixel signals from the output end in order of arrangement of the corresponding light receiving elements 32.

The second shift register 36 obtains pixel signals from the respective light receiving elements 34a arranged at even-numbered positions among the light receiving elements 34a, 34b constituting the second sensor 33 through a shift gate 36a. It then transfers the respective pixel signals to an output end of the second shift register 36 according to the transfer clock signals φ1, φ2 from the CCD control unit 19, and outputs the pixel signals from the output end in order of arrangement of the corresponding light receiving elements 34a.

The third shift register 37 obtains pixel signals from the respective light receiving elements 34b arranged at odd-numbered positions among the light receiving elements 34a, 34b constituting the second sensor 33 through a shift gate 37a. It then transfers the respective pixel signals to an output end of the third shift register 37 according to the transfer clock signals φ1, φ2 from the CCD control unit 19, and outputs the respective pixel signals in order of arrangement of the corresponding light receiving elements 34b.

In the above CCD image sensor 3, the pixel signals corresponding to the pixels at the even-numbered $(2m)^{th}$ positions (m: natural number of 1 or more) in the primary direction are outputted from the first channel (CH1) connected to the first shift register 35, the pixel signals corresponding to the pixels at the $(4m-1)^{th}$ positions (m: natural number of 1 or more) in the primary direction are outputted from the second channel (CH2) connected to the second shift register 36, and the pixel signals corresponding to the pixels at the $(4m-3)^{th}$ positions (m: natural number of 1 or more) in the primary direction are outputted from the third channel (CH3) connected to the third shift register 37.

As is known, the transfer of the pixel signals is conducted at a cycle corresponding to the inputted transfer clock signal φ1 in the respective shift registers 35 to 37. The signal charges as pixel signals are outputted from the respective shift registers 35 to 37 when the transfer clock signal φ1 is switched from H (high) to L (low).

At the respective output ends of the shift registers 35, 36, 37, known conversion circuits 35b, 36b, 37b for converting signal charges outputted from the shift registers 35, 36, 37 as pixel signals into analog voltages are provided. The conversion circuits 35b, 36b, 37b are provided with respective capacitors for converting the signal charges into analog voltages, and output signals representing the voltages of the capacitors. The conversion circuits 35b, 36b, 37b reset the voltages of the capacitors when the resetting signal RS is switched from L (low) to H (high).

Figure 3:
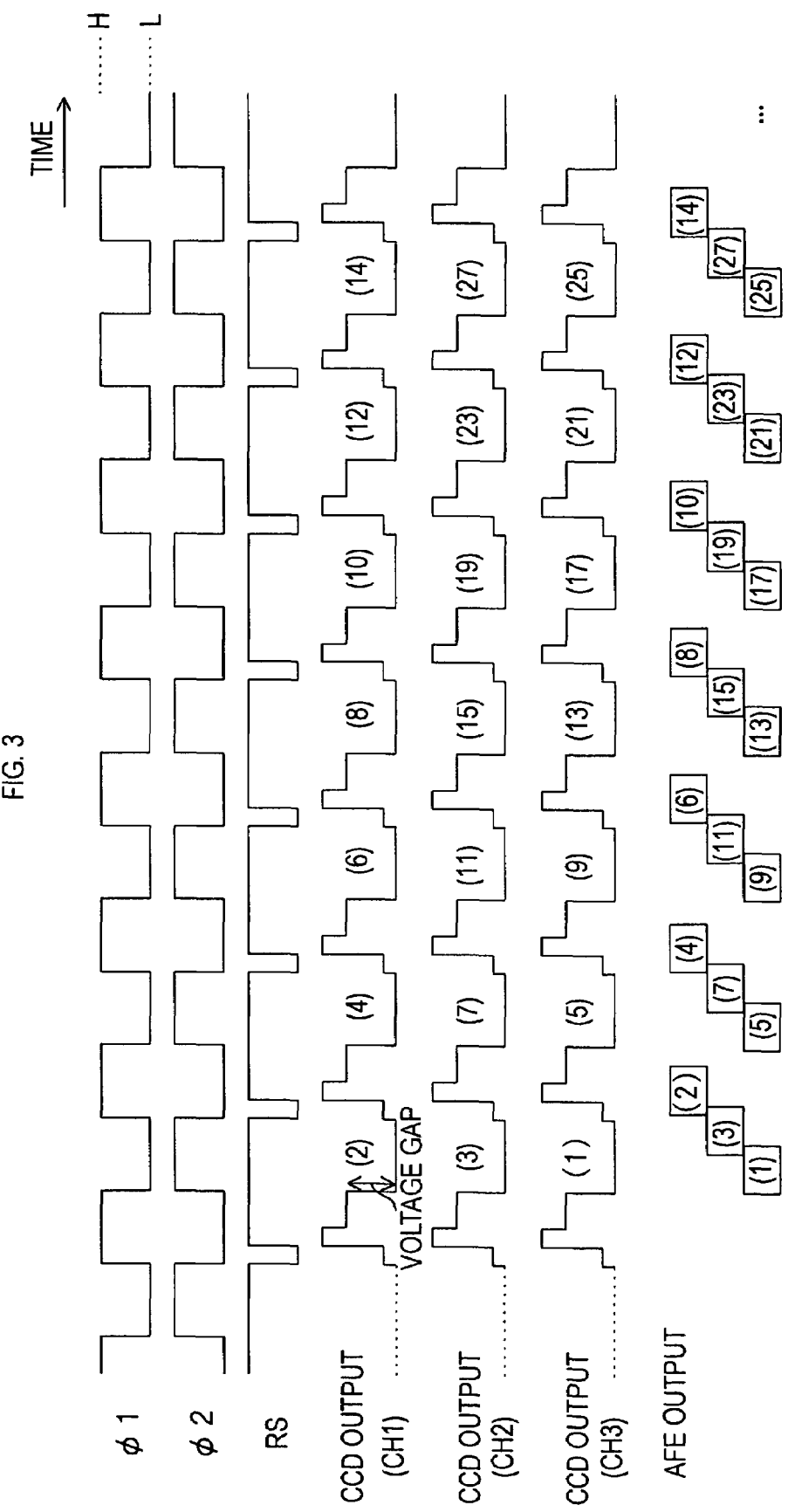
FIG. 3 is a time chart showing conditions of output signals from the CCD image sensor.

FIG. 3 is a time chart showing conditions of the pixel signals outputted from the respective channels of the CCD image sensor 3. In the conversion circuits 35b, 36b, 37b, when the transfer clock signal φ1 is switched from H to L, the signal charges are flown in from the shift registers 35, 36, 37 to change the voltages of the capacitors. As a result, pixel signals corresponding to these voltage changes are outputted from the respective channels of the CCD image sensor 3.

Voltage gaps before and after the change correspond to the signal charges outputted from the respective shift registers 35, 36, 37, and are measured by corresponding correlated double sampling circuits (CDS) 41 to 43 in the analog frontend IC 5. The measurement results are inputted to the multiplexer 7 in the analog frontend IC 5 as pixel signals. Numbers in brackets shown in FIG. 3 represent light receiving, positions (i.e. pixel positions) in the primary scanning direction of the light receiving elements 32, 34a, 34b which correspond to the pixel signals. In the bottom part of FIG. 3, the output order of pixel data is shown when the pixel data corresponding to the pixel signals from the third channel (CH3) to the first channel (CH1) are sequentially outputted from the analog, frontend IC 5.

Figure 4:
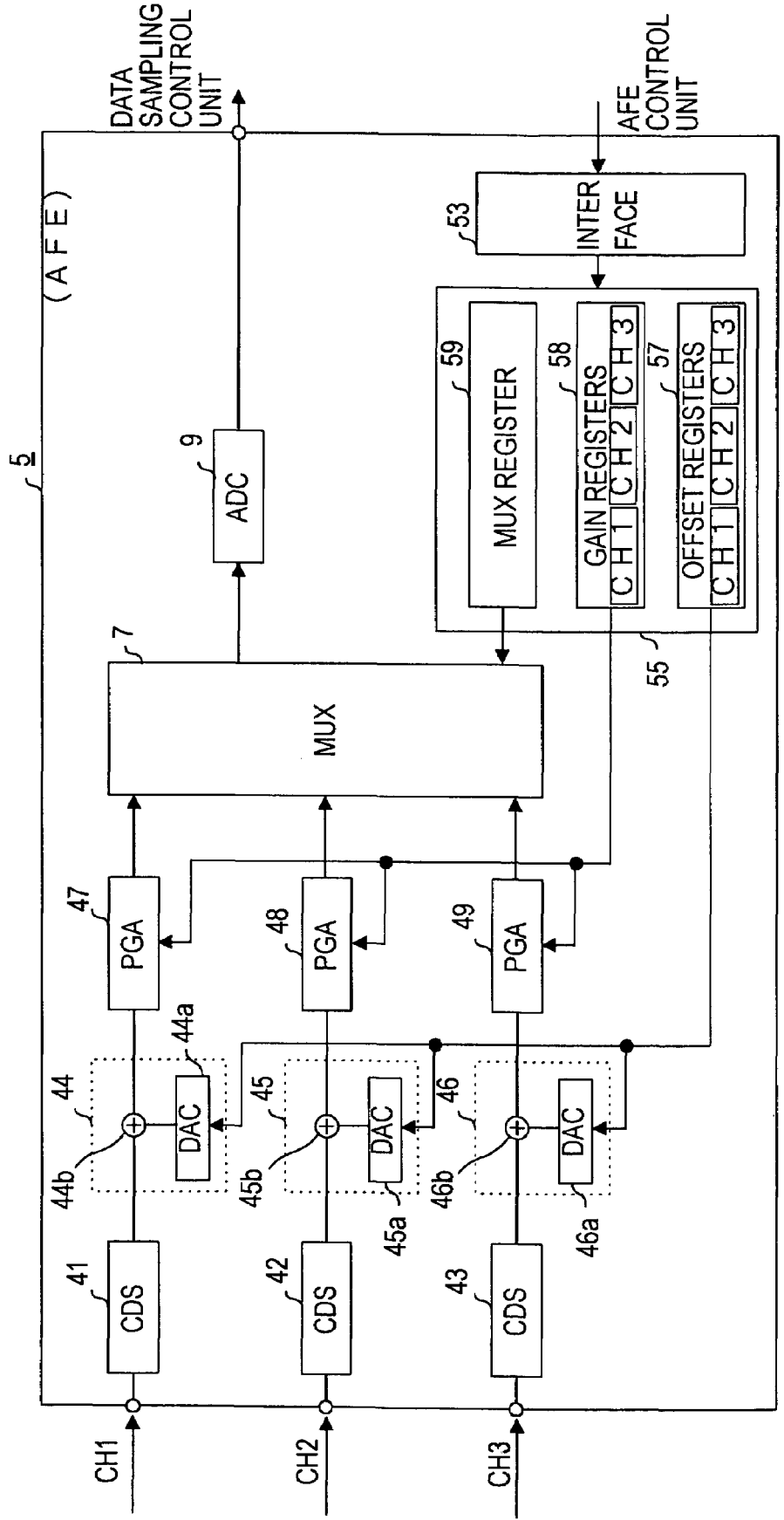
FIG. 4 is an explanatory view schematically showing an internal constitution of an analog frontend IC.

FIG. 4 is an explanatory view schematically showing an internal constitution of the analog frontend IC 5 which receives output signals from the CCD image sensor 3 shown in FIG. 3.

The analog frontend IC 5 mainly comprises the correlated double sampling circuits (CDS) 41 to 43, offset adjustment circuits 44 to 46, programmable gain amplifiers (PGA) 47 to 49, the aforementioned multiplexer (MUX) 7, the aforementioned analog/digital converter (ADC) 9, an interface 53 and a registering unit 55. Three channels are provided for the analog frontend IC 5, and the respective channels are provided with the correlated double sampling circuits 41 to 43, the offset adjustment circuits 44 to 46 and the programmable gain amplifiers 47 to 49.

The interface 53 is for use in writing various data to the registering unit 55 from an external apparatus such as the AFE control unit 21.

The correlated double sampling circuits 41 to 43 are provided for removing elements or the like that could be a source of noise or error from the pixel signals obtained from the CCD image sensor 3. They are connected to input ends of the respective channels (CH1, CH2, CH3). As is commonly known, the correlated double sampling circuits 41 to 43 eliminate an error voltage caused by the electrical charge to the capacitors when the transfer clock signal is switched between L (low) and H (high) in the shift registers 35 to 37, by sampling the pixel signals outputted from the CCD image sensor 3 twice at a certain time interval.

In the present embodiment, when the transfer clock signal φ1 is switched from H to L, the signal charges are flown into the conversion circuits 35b, 36b, 37b from the shift registers 35 to 37 to change the output voltages from the CCD image sensor 3. The correlated double sampling circuits 41 to 43 read the voltages before and after the change and output the voltage gaps as pixel signals. The output signals of the correlated double sampling circuits 41 to 43 are inputted to the offset adjustment circuits 44 to 46.

The offset adjustment circuits 44 to 46 including digital/analog converters (DAC) 44a, 45a, 46a and adders 44b, 45b, 46b, respectively, add offset voltages to input signals from the respective channels (CH1, CH2, CH3). Offset registers 57 provided in the registering unit 55 store set offset values for the respective channels which indicate the offset voltages added by the offset adjustment circuits 44 to 46. The offset adjustment circuits 44 to 46 of the respective channels add the offset voltages corresponding to the respective set offset values stored in the offset registers 57 to the pixel signals transmitted from the correlated double sampling circuits 41 to 43, and provide the pixel signals with the offset voltages added to the programmable gain amplifiers 47 to 49 of the corresponding channels.

The programmable gain amplifiers 47 to 49, which are known analog amplifiers capable of adjusting the gain with respect to the input signals, are provided downstream of the respective offset adjustment circuits 44 to 46. Gain registers 58 provided in the registering unit 55 store set gain values for the respective channels which indicate the gains to be set at the respective programmable gain amplifiers 47 to 49. The respective programmable gain amplifiers 47 to 49 of the respective channels amplify the pixel signals of the corresponding channels provided from the CCD image sensor 3 through the offset adjustment circuits 44 to 46 by the gains in accordance with the respective set gain values stored in the gain registers 58, and provide the multiplexer 7 with the amplified pixel signals. The programmable gain amplifiers are hereinafter referred to simply as "amplifiers."

The multiplexer 7 has three input channels and one output channel. The respective input channels are connected to the output ends of the corresponding amplifiers 47 to 49, and the output channel is connected to the analog/digital converter 9. The multiplexer 7, which is designed to select one of the input signals from the three amplifiers 47 to 49 depending on the set value in a register 59, sequentially provides the analog/digital converter 9 with the pixel signals amplified by the respective amplifiers 47 to 49.

The analog/digital converter 9 converts the analog pixel signals outputted from the multiplexer 7 into digital signals (pixel data) and outputs the digital signals. The output end of the analog/digital converter 9 is connected to the data sampling control unit 11.

Figure 5:
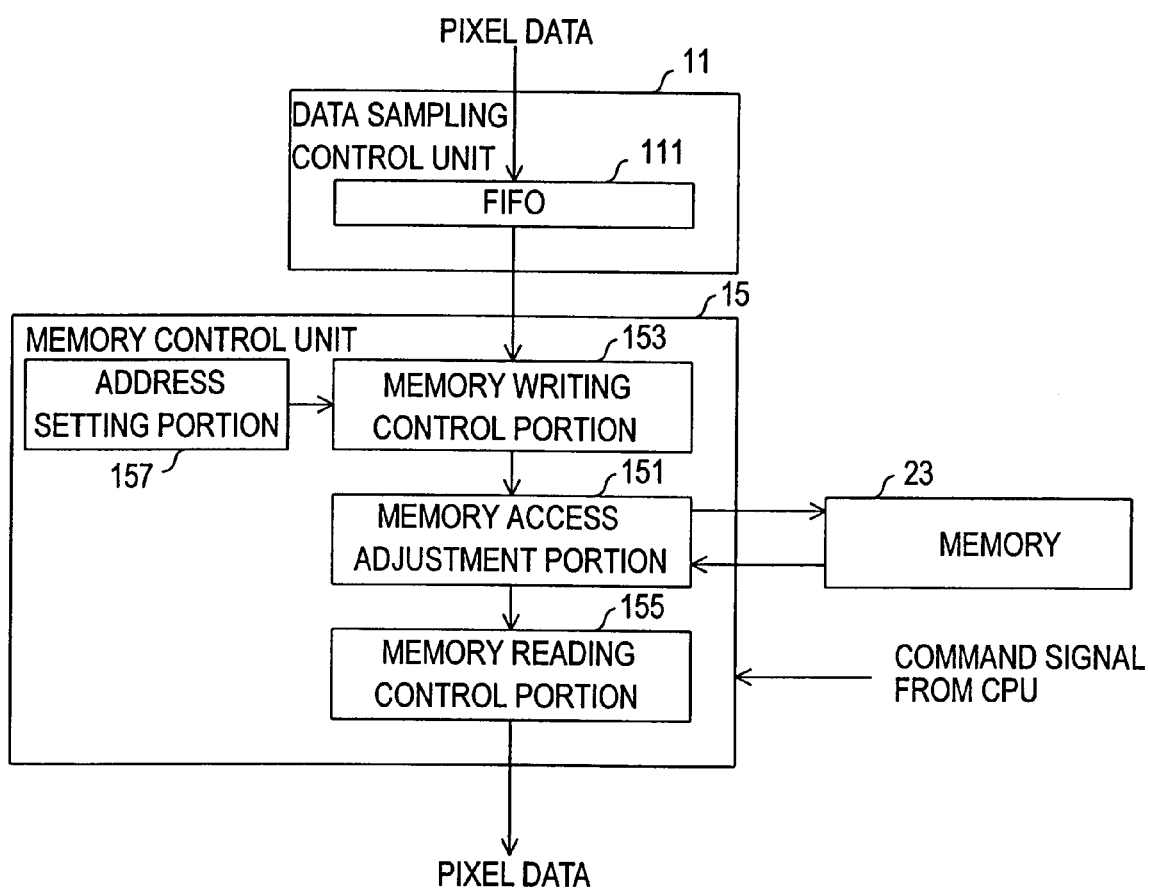
FIG. 5 is a block diagram showing a constitution of a memory control unit.

Now, the detailed constitution of the memory control unit 15, which obtains the pixel data outputted from the above analog frontend IC 5 via the data sampling control unit 11, is explained. FIG. 5 is a schematic block diagram showing a constitution of the memory control unit 15.

The memory control unit 15 mainly comprises a memory access adjustment portion 151, a memory writing control portion 153, a memory reading control portion 155 and an address setting portion 157.

The memory access adjustment portion 151 is for controlling access to the memory 23. When the memory access adjustment portion 151 receives a request for access to the memory 23 from the above memory writing, control portion 153 or memory reading control portion 155, it permits access of the requester to the memory 23 in an appropriate manner, taking into account the other access requests.

The memory writing control portion 153 sequentially reads out the pixel data from the aforementioned analog frontend IC 5 stored in the FIFO memory (i.e. first in, first out memory) 111 by the data sampling control unit 11. In addition, the memory writing control portion 153, after making a request for access to the memory access adjustment portion 151 and obtaining a right to access, writes the pixel data obtained from the data sampling control unit 11 to areas in the memory 23 which correspond to destination memory addresses set by the address setting portion 157.

When the memory reading control portion 155 receives a reading command from the CPU 13, it accesses the memory 23 to read the pixel data in order of the lower-numbered memory address, and outputs the pixel data to the external image forming apparatus 25.

Figure 6:
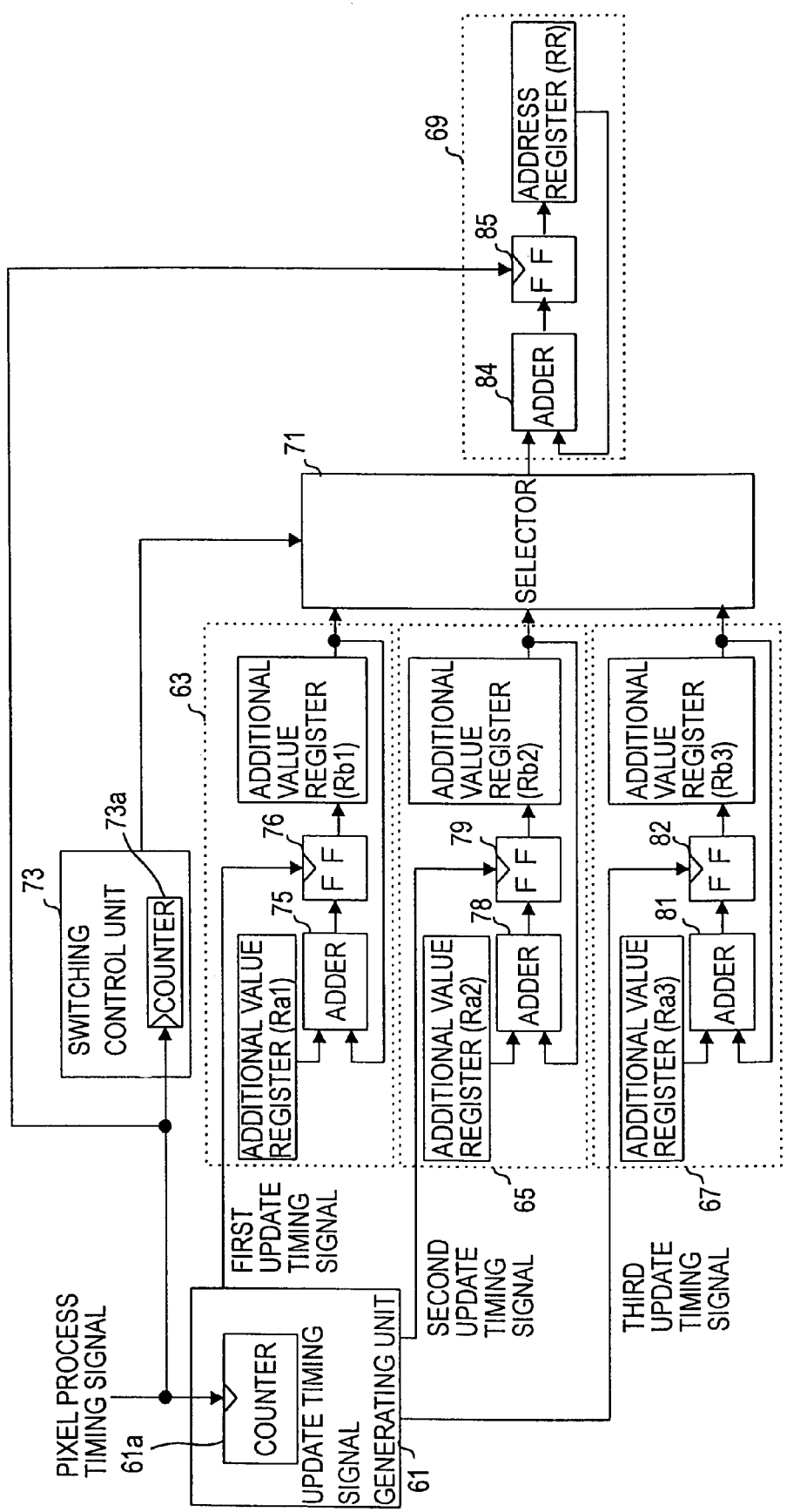
FIG. 6 is a block diagram showing a constitution of an address setting unit.

Now, a constitution of the aforementioned address setting portion 157 for setting the destination memory address is explained by way of FIG. 6. FIG. 6 is a schematic block diagram showing a constitution of the address setting portion 157.

The address setting portion 157 repeats add and subtract operation which conforms to the output pattern of the pixel data from the analog frontend IC 5 to an initial value set in the setting process (see FIG. 7) by the CPU 13, to set the destination memory addresses corresponding to the pixel positions of the respective pixel data. These operations are implemented by an update timing signal generating unit 61, a first calculation unit 63, a second calculation unit 65, a third calculation unit 67, an address registration unit 69, a selector 71, a switching control unit 73, etc. The output pattern herein means output order of the, pixel data which is defined by switching the respective channels CH1, CH2, CH3 of the CCD image sensor 3.

The address setting portion 157 operates synchronously with the memory writing control portion 153. It actuates the above switching control unit 73 for switching the output of the update timing signal generating unit 61 and selector 71 based on a pixel process timing signal inputted each time the memory writing control portion 153 writes the pixel data for one pixel to the memory 23.

The update timing signal generating unit 61 controls operation timings of the first to third calculating units 63, 65, 67. It actuates a built-in counter 61a every time the aforementioned pixel process timing signal is received, and provides an update timing signal to one of the calculating units 63, 65, 67 which corresponds to the counter value.

The first calculating unit 63 comprises additional value registers Ra1, Rb1, an adder 75, and a flip-flop circuit (FF) 76. The value V_Rb1 stored in the additional value register Rb1 and the value V_Ra1 stored in the additional value register Ra1 are added in the adder 75, and every time the first update timing signal is received, the resulting sum of V_Ra1 +V_Rb1 is written over the value V_Rb1 in the additional value register Rb1 to be updated.

The second calculating unit 65 comprises additional value registers Ra2, Rb2, an adder 78, and a flip-flop circuit (FF) 79.

The value V_Rb2 stored in the additional value register Rb2 and the value V_Ra2 stored in the additional value register Ra2 are added in the adder 78, and every time the second update timing signal is received, the resulting sum of V_Ra2+V_Rb2 is written over the value V_Rb2 in the additional value register Rb2 to be updated.

The third calculating unit 67 comprises additional value registers Ra3, Rb3, an adder 81, and a flip-flop circuit (FF) 82. The value V_Rb3 stored in the additional value register Rb3 and the value V_Ra3 stored in the additional value register Ra3 are added in the adder 81, and every time the third update timing signal is received, the resulting sum of V_Ra3+V_Rb3 is written over the value V_Rb3 in the additional value register Rb3 to be updated.

The selector 71 is controlled by the switching control unit 73, and provides the address registering unit 69 with one of values stored in the additional value registers Rb1 to Rb3 of the first to third calculating units 63, 65, 67 depending on the output pattern of the pixel data from the analog frontend IC 5. Particularly, the switching control unit 73 controls the selector 71 based on the value in a built-in counter 73a which is incremented every time the pixel process timing signal is received.

The address registering unit 69 comprises an adder 84, a flip-flop circuit (FF) 85, and an address register RR. Every time the pixel timing signal is received, the address registering unit 69 adds the value V_Rb outputted from the selector 71 which is one of values in the additional value registers Rb1 to Rb3, and the destination memory address V_RR stored in the address register RR, and writes the resulting sum of V_Rb+V_RR over the value V_RR in the address register RR to be updated.

Figure 7:
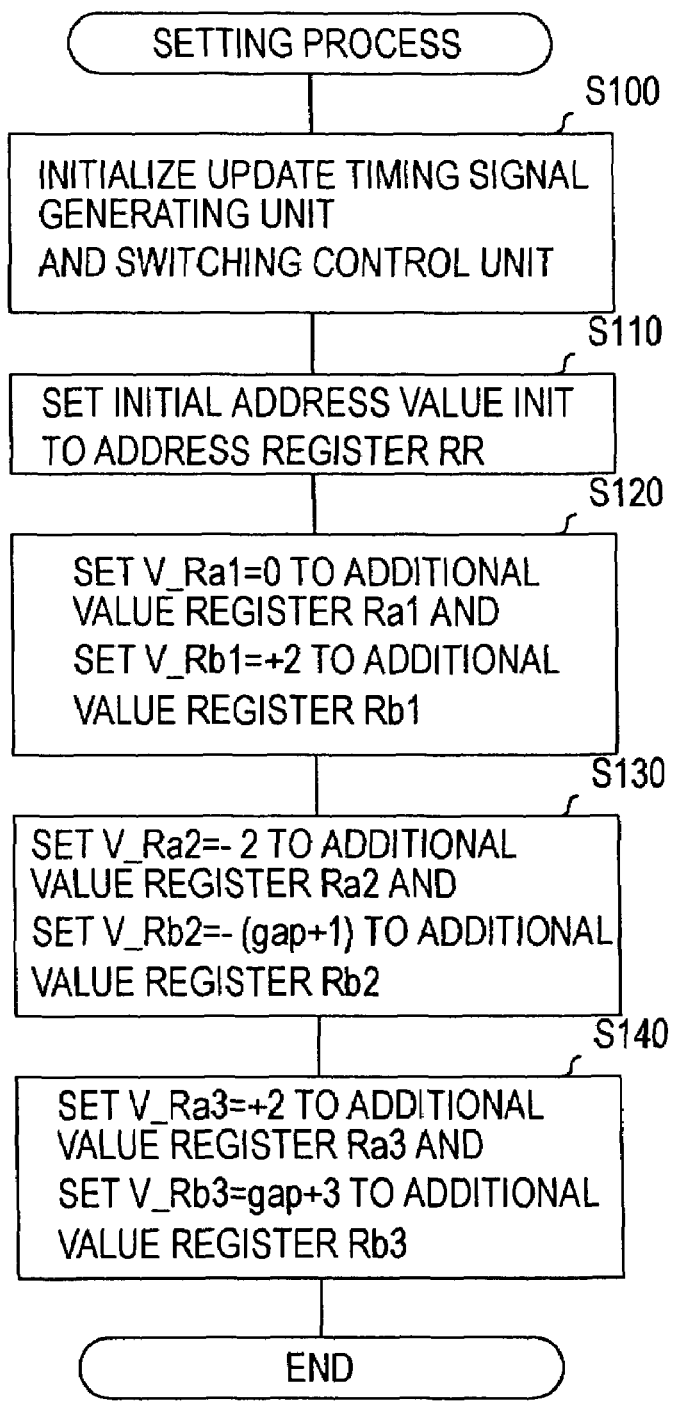
FIG. 7 is a flowchart showing a setting process executed by CPU.

Now, a setting process in FIG. 7 performed by the CPU 13, is explained, when the multiplexer 7 of the present embodiment is designed to select the amplifier 49 of the third channel (CH3), the amplifier 48 of the second channel (CH2) and the amplifier 47 of the first channel (CH1) in turn to repeat operation for inputting the pixel signals outputted from the amplifiers 47 to 49 to the analog digital converter 9. FIG. 7 is a flowchart describing a setting process performed by the CPU 13 when a command for reading an image is inputted from the outside.

When the process is started, the CPU 13 firstly initializes the update timing signal generating unit 61 so that the update timing signals are inputted to the respective calculating units 63, 65, 67 according to the output pattern of the pixel data from the analog frontend IC 5. It also initializes the switching control unit 73 so that the selector 71 is switched according to the output pattern of the pixel data (S100). An initial value INIT is set in the address register RR as the destination memory address (S110).

When the multiplexer 7 switches the input signal to the analog digital converter 9 from the pixel signal from the third channel to the pixel signal from the second channel, the CPU 13 sets an initial value 0 to the additional value register Ra1 and an initial value +2 to the additional value register Rb1 in order to calculate the pixel position of the pixel data from the second channel outputted from the analog frontend IC 5 (S120). The value +2 in the additional value register Rb1 represents the pixel position of the pixel signal from the second channel relative to the pixel position of the pixel signal from the third channel.

When the multiplexer 7 switches the input signal to the analog digital converter 9 from the pixel signal from the second channel to the pixel signal from the first channel, the CPU 13 sets an initial value −2 to the additional value register Ra2 and an initial value −(gap+1) to the additional value register Rb2 in order to calculate the pixel position of the pixel data from the first channel outputted from the analog frontend IC 5 (S130).

The value gap is obtained from the following relational expression: gap=Va×Vb, where Va is the number of the light receiving elements (linewidth) of the first sensor 31 and second sensor 33 in the primary scanning direction, and Vb is a space (linegap) between the first sensor 31 and second sensor 33 in the secondary scanning direction. For example, when Va=4096 and Vb=5, then gap=20480, and when Va=256 and Vb=5, then gap=1280. In the following descriptions (by way of FIG. 8, etc.), a case in which gap=1280 is taken as an example for the sake of simple description. However, it should be noted that the image reading apparatus of the present invention is not limited to this particular embodiment.

The value −2 is set to the additional value register Ra2 since the pixel signal at the pixel position 4m−1 in the primary scanning direction is outputted from the second channel of the CCD image sensor 3, while the pixel signal at the pixel position of 2m in the primary scanning position is outputted from the first channel.

When the multiplexer 7 switches the input signal to the analog digital converter 9 from the pixel signal from the first channel to the pixel signal from the third channel, the CPU 13 sets an initial value +2 to the additional value register Ra3, and an initial value gap+3 to the additional value register Rb3 in order to calculate the pixel position of the pixel data from the third channel outputted from the analog frontend IC 5 (S140). This process is then ended. The value +2 is set to the additional value register Ra3 since the pixel signal having the pixel position 2m in the primary scanning direction is outputted from the first channel of the CCD image sensor 3 while the pixel signal having the pixel position 4m−3 in the primary scanning position is outputted from the third channel.

Figures 8A, 8B:
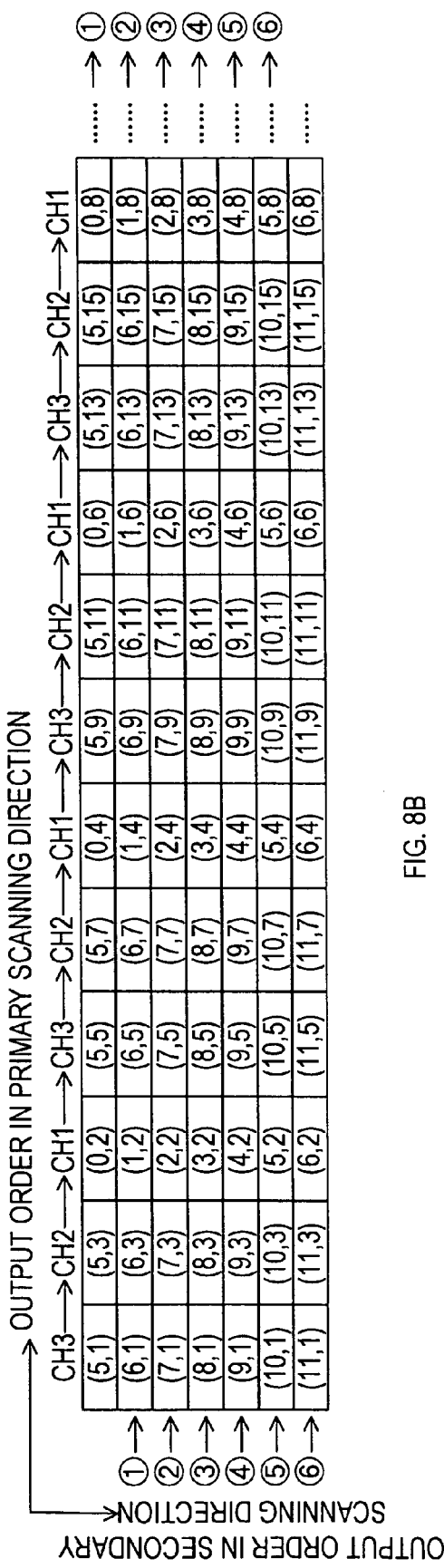
FIG. 8A is an explanatory view showing an input order of pixel data.
FIG. 8B is an explanatory view showing an arrangement of pixel data in a memory.

Next, a writing process of the pixel data performed in the memory control unit 15 after the above setting process is ended is described. FIG. 8A is an explanatory view showing an input order of the pixel data to be inputted to the memory control unit 15 from the analog frontend IC 5 via the data sampling control unit 11. FIG. 8B is an explanatory view showing an arrangement of the pixel data in the memory 23.

Figure 9:
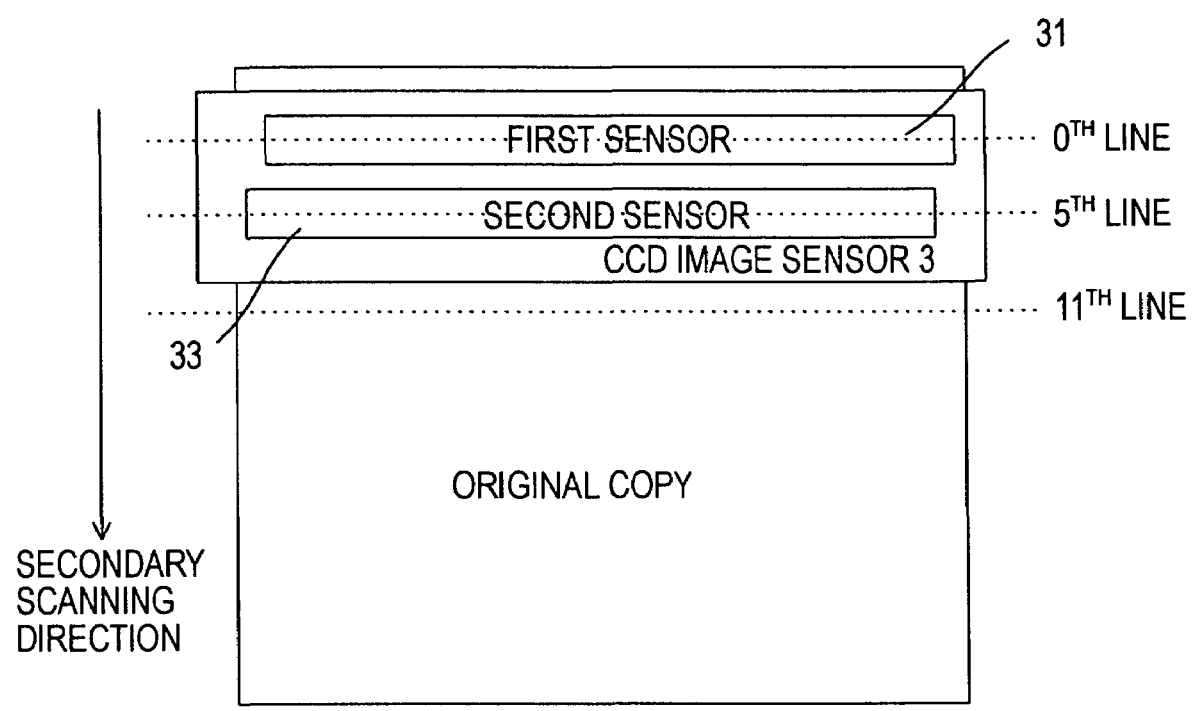
FIG. 9 is an explanatory view showing conditions for reading an image.

After the completion of the above setting process, the CPU 13 actuates the CCD control unit 19 and provides the CCD image sensor 3 with the transfer clock signals $\phi1$, $\phi2$ for activating the shift registers 35 to 37 from the CCD control unit 19, to control the transfer operation of the shift registers 35 to 37 via the CCD control unit 19 and read a line of an image in the primary scanning direction. After the image reading in the primary scanning direction for the line is completed, the CPU 13 relatively moves the original copy or the CCD image sensor 3 to the secondary scanning direction via a motor control unit which activates a not shown original copy feed mechanism or reading unit, to scan the image again in the primary scanning direction to read the next line. By repeating these operations, the CPU 13 reads the image two-dimensionally using the CCD image sensor 3. FIG. 9 is an explanatory view illustrating the conditions of the image reading.

As a result, the pixel data in the primary scanning direction, starting from the pixel data corresponding to the light receiving element 34b on the start end of the second sensor 33, are sequentially outputted to the third channel (CH3), the second channel (CH2) and the first channel (CH1) in this order from the analog frontend IC 5. After the completion of the image reading for a line in the primary scanning direction by the first sensor 31 and second sensor 33, the next line of the image is read and the pixel data of the image are outputted from the analog frontend IC 5 to the third channel (CH3), the second channel (CH2) and the first channel (CH1) in this order as well.

FIG. 8A shows an order of the pixel data to be inputted to the memory control unit 15 when image reading with respect to the $5^{th}$ to $11^{th}$ lines is performed by the second sensor 33. In Figures, a pixel position of the pixel data is represented as (line No., pixel position No. in the primary scanning direction).

Particularly, the pixel data are sequentially inputted to the memory control unit 15, starting from the pixel data having the pixel position of (5, 1) to (5, 3), (0, 2), (5, 5), (5, 7), (0, 4), (0, 8), ... ①..., (6, 1), (6, 3), ..., (1, 8), ..., ②... ((7, 1), .... In response to these inputs, the memory control unit 15 calculates the pixel positions of the respective pixel data in the calculating units 63, 65, 67 after the above setting process and in the address registering unit 69, and writes the pixel data to the memory areas corresponding to the pixel positions.

Particularly, the memory writing control portion 153, at the time when obtaining the pixel data of the pixel position (5, 1), writes the pixel data to the memory 23 area corresponding to the value INIT in the address register RR (In FIG. 8B, 0x0500). When this writing is completed, the result of add operation of the initial value +2 in the additional value register Rb1 and the value INIT in the address register RR, that is, INIT+2 (In FIG. 8B, 0x0502), is written to the address register RR in response to the input of the aforementioned pixel process timing signal, and the destination memory address is updated. Then, the update timing signal generating unit 61 provides the first calculating unit 63 with a first update timing signal to update the additional value register Rb1. In the present embodiment, however, since the value in the additional value register Ra1 is equal to 0, the value +2 in the additional value register Rb1 is maintained after the update. The switching control unit 73 controls the selector 71 to be connected to the second calculating unit 65.

When there is an input of the pixel data in the pixel position (5, 3), the memory writing control portion 153 writes the pixel data in the pixel position (5, 3) to the memory area corresponding to the memory address INIT+2 (0x0502 in the Figure), which is the value in the address register RR. When this writing is completed, the initial value −(gap+1) in the additional value register Rb2 and the value INIT+2 in the address register RR are added in the adder 84 and the resulting sum of INIT−gap+1 (0x0001) is written to the address register RR in response to the input of the aforementioned pixel process timing signal to update the destination memory address. Then, the update timing signal generating unit 61 provides the second calculating unit 65 with the second update timing signal to update the additional value register Rb2. The switching control unit 73 controls the selector 71 to be connected to the third calculating unit 67.

When there is an input of the pixel data in the pixel position (0, 2), the memory writing control portion 153 writes the pixel data in the pixel position (0, 2) to the memory area corresponding to the memory address INIT−gap+1. When this writing is completed, the initial value gap+3 in the additional value register Rb3 and the value INIT−gap+1 in the address register RR are added, and the resulting sum of INIT+4 (0x0504 in the Figure) is written to the address register RR in response to the input of the pixel process timing signal to update the destination memory address. Then, the update timing signal generating unit 61 provides the second calculating unit 65 with the third update timing signal to update the additional value register Rb2. The switching control unit 73 controls the selector 71 to be connected to the third calculating unit 67.

When there is an input of the pixel data in the pixel position (5, 5), the memory writing control portion 153 writes the pixel data in the pixel position (5, 5) to the memory area corresponding to the memory address INIT+4 (0x0504 in the Figure). When this writing is completed, the initial value +2 in the additional value register Rb1 and the value INIT+4 in the address register RR are added, and the resulting sum of INIT+6 (0x0506 in the Figure) is written to the address register RR in response to the input of the pixel process timing signal to update the destination memory address. Then, the update timing signal generating unit 61 provides the first calculating unit 63 with the first update timing signal to update the additional value register Rb1. The switching control unit 73 controls the selector 71 to connect the second calculating unit 65 and the selector 71.

When there is an input of the pixel data in the pixel position (5, 7), the memory writing control portion 153 writes the pixel data in the pixel position (5, 7) to the memory area corresponding to the memory address INIT+6 (0x0506 in the Figure). When this writing is completed, the initial value −(gap+3) in the additional value register Rb2 and the value INIT+6 in the address register RR are added, and the resulting sum of INIT−gap+3 (0x0003) is written to the address register RR in response to the input of the pixel process timing signal to update the destination memory address. Then, the update timing signal generating unit 61 provides the second calculating unit 65 with the second update timing signal to update the additional value register Rb2. The switching control unit 73 controls the selector 71 to be connected to the third calculating unit 67.

When there is an input of the pixel data in the pixel position (0, 4), the memory control unit 15 writes the pixel data in the pixel position (0, 4) to the memory area INIT−gap+3. After the writing is completed, the value gap+5 in the additional value register Rb3 and the value INIT−gap+3 in the address register RR are added and the resulting sum of INIT+8 (0x0508 in the Figure) is written to the address register RR in response to the input of the pixel process timing signal to update the destination memory address.

The aforementioned operations are repeated to write the respective pixel data to the areas having the memory addresses corresponding to the pixel positions in the memory 23.

According to the image reading apparatus 1 of the present embodiment, after the setting process (FIG. 7) by the CPU 13, the first calculating unit 63 sequentially calculates the pixel position of the pixel data corresponding to the pixel signal outputted from the second shift register 36 using a difference between the pixel position and the pixel position of the pixel data corresponding to the pixel signal in the third shift register 37 outputted last time from the analog frontend IC 5, the second calculating unit 65 sequentially calculates the pixel position of the pixel data corresponding to the pixel signal outputted from the first shift register 35 using a difference between the pixel position and the pixel position of the pixel data corresponding to the pixel signal in the second shift register 36 outputted last time from the analog frontend IC 5, and the third calculating unit 67 sequentially calculates the pixel position of the pixel data corresponding to the pixel signal outputted from the third shift register 37 using a difference between the pixel position and the pixel position of the pixel data corresponding to the pixel signal in the first shift register 35 outputted last time from the analog frontend IC 5.

The selector 71, under the control of the switching control unit 73, outputs one of the calculation results of the first to third calculating units 63, 65, 67 which represents the pixel position of the pixel data to be inputted next according to the output pattern of the pixel data from the analog frontend IC 5, and provides the address registering unit 69 with the calculation result.

The address registering unit 69 adds one of the calculation results in the first to third calculating units 63, 65, 67 obtained via the selector 71 to the last value in the address register RR to set the next destination memory address.

Accordingly, the image reading apparatus 1 of the present embodiment can perform sorting of the pixel data as well as writing of the same to the memory 23 at the same time. As a result, it is possible to store the pixel data in the memory 23 in their original order, and to complete the sorting of the pixel data with fewer memory access times than those in the conventional image reading apparatus. As a result, there is no need to provide an additional working area in the memory 23 necessary for the sorting operation. Furthermore, during the sorting operation, steps to be performed by the CPU 13 and the access times to the memory 23 can be reduced and thus, decline in the processing speed of the overall image reading apparatus 1 can be avoided.

The constitution of the address setting portion 157 is not limited to the above constitution, and various modifications are possible. In the above embodiment, the difference between the pixel position of the inputted pixel data and the pixel position of the pixel data last inputted is firstly calculated, and by adding the difference to the last value in the address register RR, the destination memory address corresponding to the pixel position of the next pixel data is calculated. However, the memory address corresponding to the pixel position can be calculated per pixel data from each channel, and the calculated value may be stored in the address register RR as the destination memory address.

Figure 10:
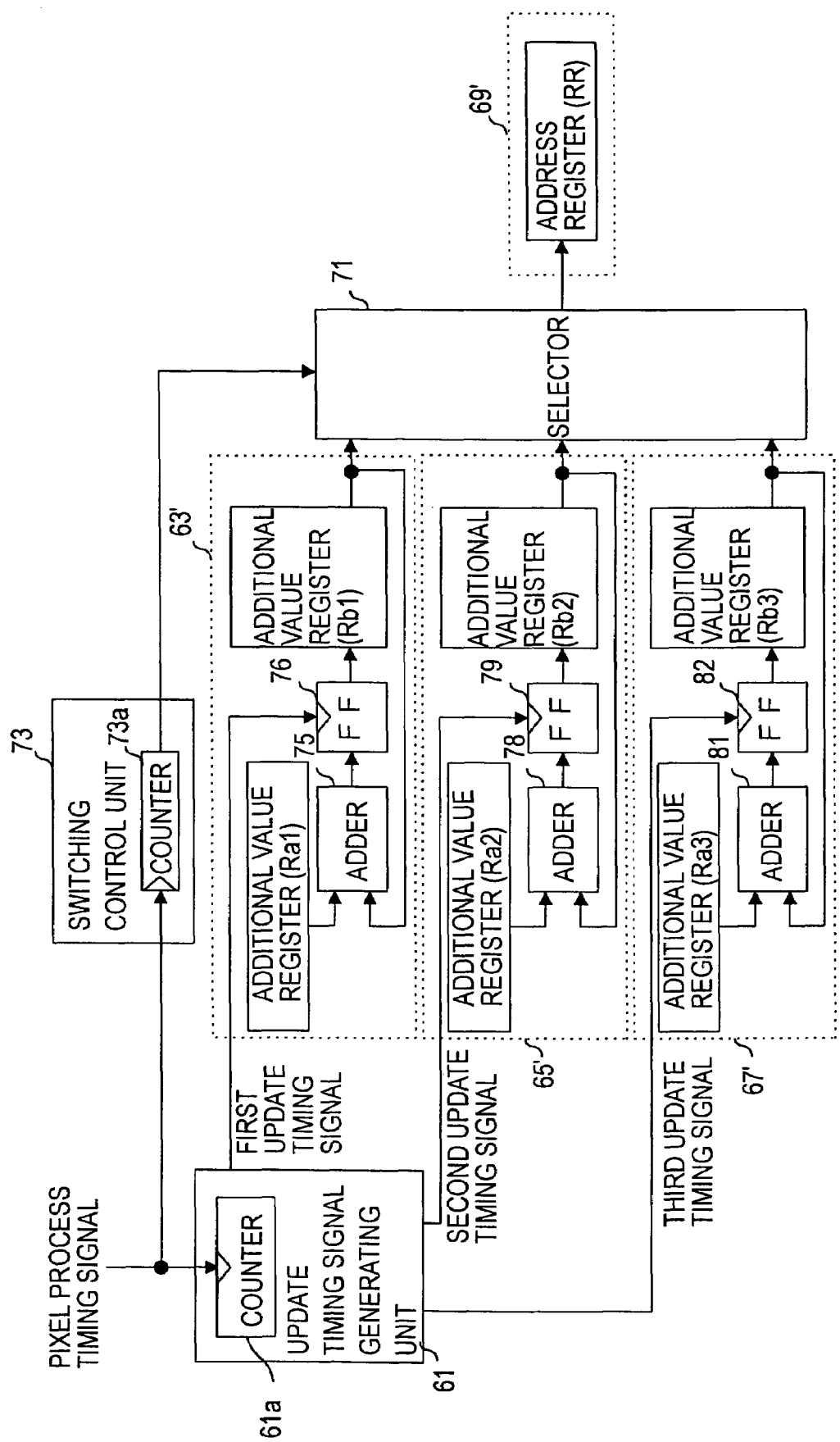
FIG. 10 is a schematic block diagram showing a constitution of the address setting unit according to a first modification.

FIG. 10 is an explanatory view showing an internal constitution of the preferred address setting portion 157 when the memory address corresponding to the pixel position is calculated per pixel data from each channel and the resulting calculated value is stored in the address register RR. From now on, a constitution of the address setting portion 157 in the above case is explained as a first modification of the present embodiment. The descriptions regarding the same components as in the above embodiment are not repeated.

Figure 11:
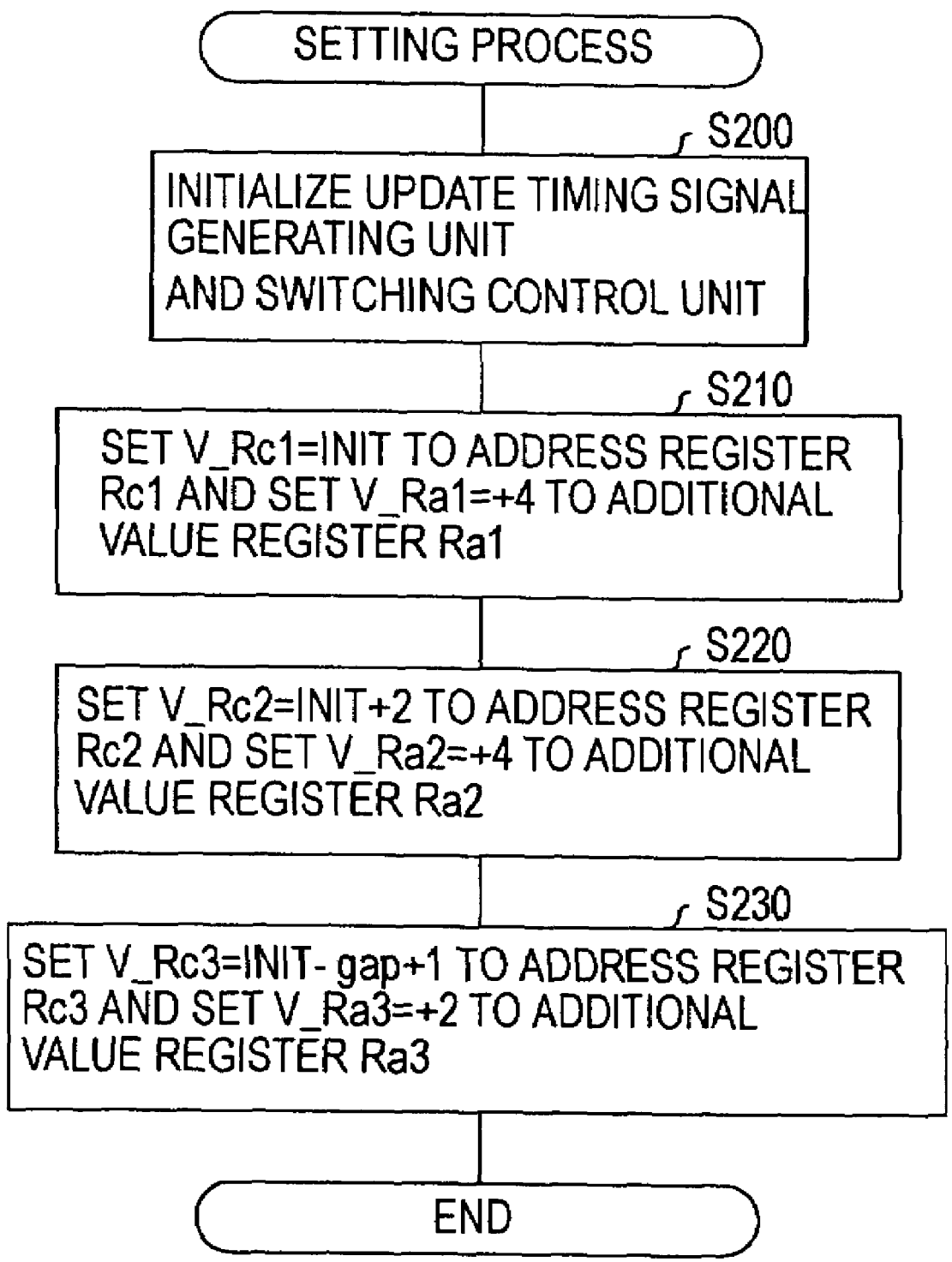
FIG. 11 is a flowchart showing a setting process for the first modification executed by the CPU.

The address setting portion 157 of the first modification comprises address registers Rc1 to Rc3, instead of the additional value registers Rb1 to Rb3, in the respective calculating units 63', 65', 67'. The address registering unit 69' is provided only with the address register RR. The CPU 13 executes a modified setting process shown in FIG. 11, instead of the setting process shown in FIG. 7, when there is an input of a reading command from the outside. FIG. 11 is a flowchart showing a modified setting process executed by the CPU 13.

When the process is started, the CPU 13 initializes the update timing signal generating unit 61 and switching control unit 73 according to the output pattern of the pixel data from the analog frontend IC 5 (S200). The CPU 13 also sets an initial value, INIT in the address register Rc1, and an additional value +4 in the additional value register Ra1 (S210).

The CPU 13 sets a value INIT+2 in the address register Rc2, and an additional value +4 in the additional value register Ra2 (S220). Then, the process moves to step S230, and the CPU 13 sets a value INIT−gap+1 in the address register Rc3 and an additional value +2 in the additional value register Ra3. The present setting process is ended.

When the values in the registers are set as above by the CPU 13, the first calculating unit 63' adds the value +4 set in the additional value register Ra1 to the value V_Rc1 (initial value INIT) in the address register Rc1 every time the first update timing signal is inputted, to calculate the memory address corresponding to the pixel position of the pixel data corresponding to the pixel signal outputted from the third shift register 37, and sets the memory addresses INIT, INIT+4, INIT+8, in the address register Rc1 sequentially.

The second calculating unit 65' adds the value +4 set in the additional value register Ra2 to the value V_Rc2 (initial value INIT+2) in the address register Rc2 every time the second update timing signal is inputted, to calculate the memory address corresponding to the pixel position of the pixel data corresponding to the pixel signal outputted from the second shift register 36, and sets the memory addresses INIT+2, INIT+6, INIT+10, . . . in the address register Rc2 sequentially.

The third calculating unit 67' adds the value +2 set in the additional value register Ra3 to the value V_Rc3 (initial value INIT−gap+1) in the address register Rc3 every time the third update timing signal is inputted, to calculate the memory address corresponding to the pixel position of the pixel data corresponding to the pixel signal outputted from the first shift register 35, and sets the memory addresses INIT−gap+1, INIT−gap+3, INIT−gap+5, . . . in the address register Rc3 sequentially.

The selector 71 sequentially provides the address register RR in the address registering unit 69' with the respective values in the address registers Rc1, Rc2, Rc3 repeatedly under the control of the switching control unit 73. As a result, in the address registering unit 69', the destination memory addresses INIT, INIT+2, INIT−gap+1, INIT+4, INIT+6, INIT−gap+3, INIT+8 . . . are set in the address register RR sequentially.

The update timing signal generating unit 61, in the same manner as in the above embodiment, provides the corresponding calculating units 63', 65', 67', with the update timing signal to update the values in the address register Rc1 to Rc3 when the values in the address registers Rc1 to Rc3 are set in the address register RR.

In the image reading apparatus 1 of the first modification, when the pixel data are outputted from the analog frontend IC 5 in the order shown in FIG. 8A, the pixel data are written to the areas in the memory 23 corresponding to the destination memory addresses in the memory writing control portion 153. Thus, it is possible to sort the respective pixel data in order of the pixel arrangement and store the same in the memory 23 (see FIG. 8B). The address register RR is provided in the first modification. However, if the memory writing control portion 153 is designed to be capable of accessing the address registers Rc1 to Rc3 via the selector 71, there is no need to provide the address register RR in the first modification.

Now, a second modification of the present embodiment is described. The second modification improves efficiency in writing the pixel data by simultaneously writing a plurality of pixel data to the memory 23 using byte enable signal. The second modification is based on the assumption that memory 23 and the memory control unit 15 are connected by a 32-bit (4-byte) data bus so that the 32-bit data transfer can be realized therebetween and that each pixel data has 8-bit (1-byte) data. As is well-known in the art, byte enable signal is a signal used for accessing a memory in a smaller unit than a data transfer bit.

Figure 12:
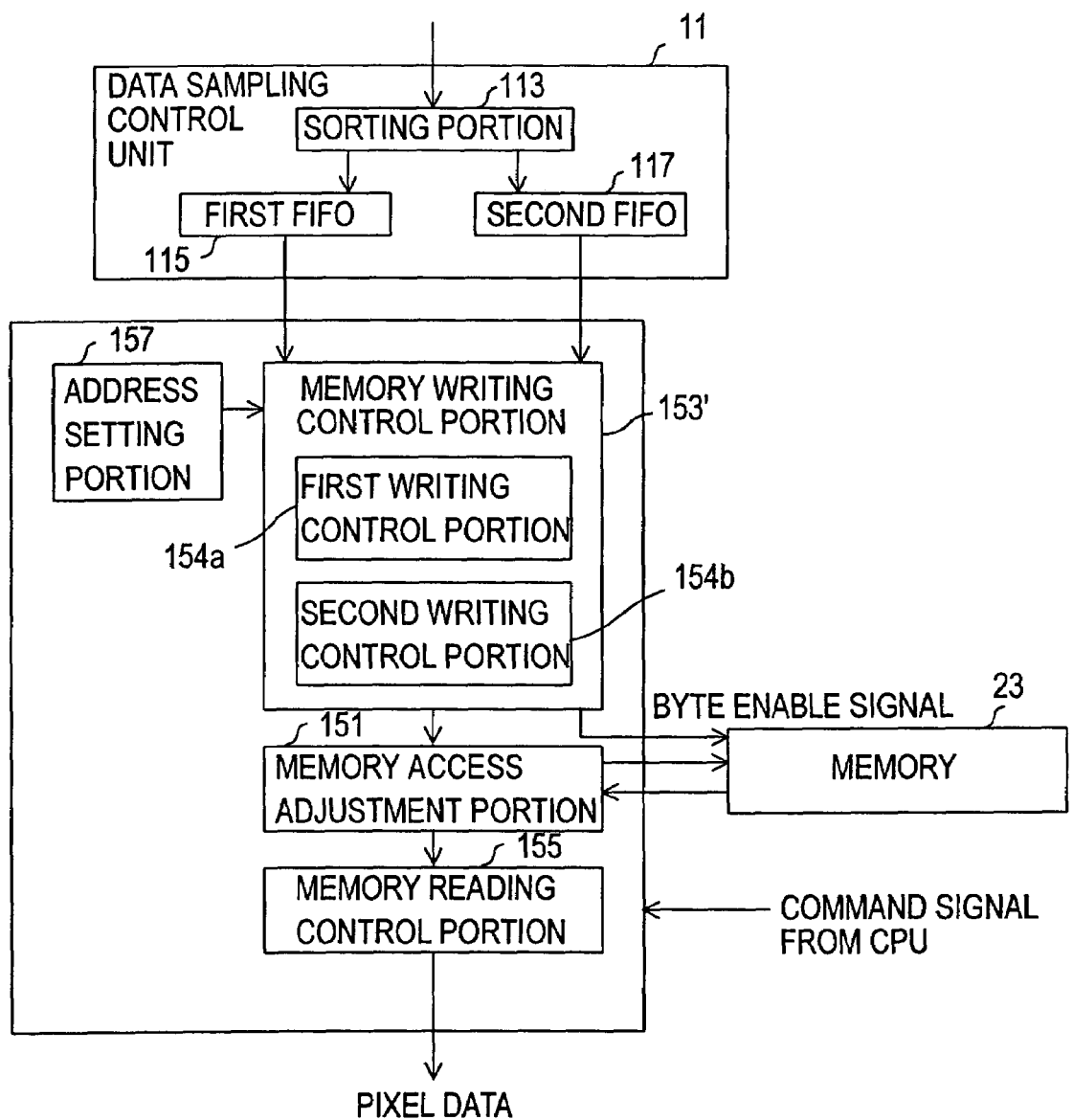
FIG. 12 is a schematic block diagram showing a constitution of a data sampling control unit and a memory control unit according to a second modification.
Figure 13A:
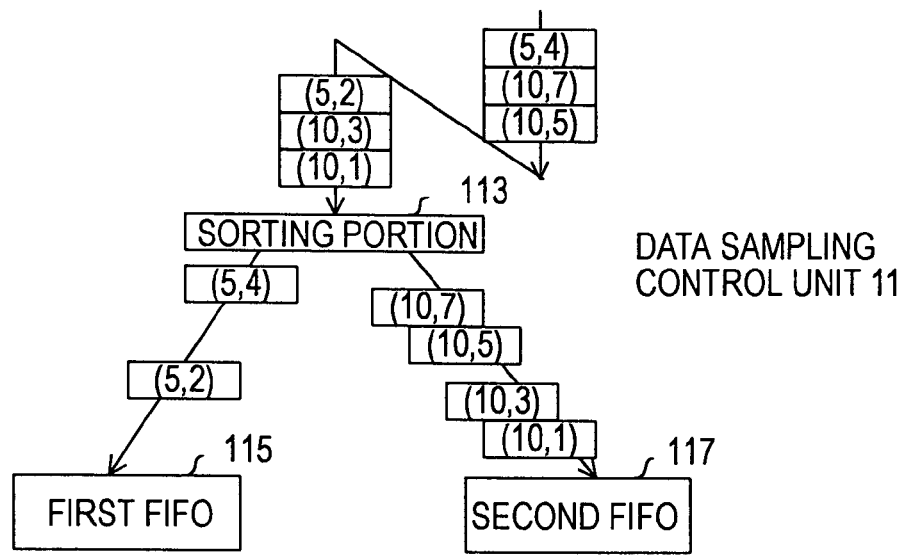
FIG. 13A is an explanatory view showing operations of a sorting portion in the data sampling unit according to the second modification.
Figure 13B:
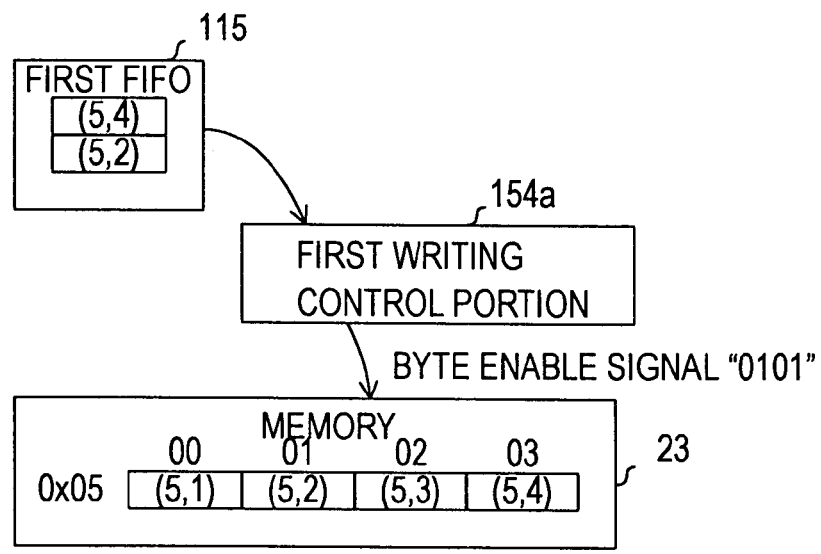
FIG. 13B is an explanatory view showing operations of a first writing control portion in the memory writing control unit.
Figure 13C:
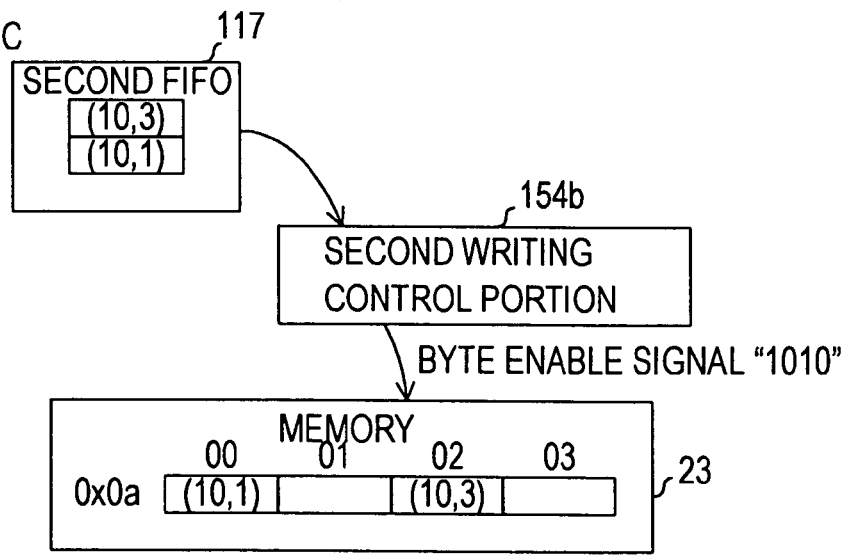
FIG. 13C is an explanatory view showing operations of a second writing control portion in the memory writing control unit.

FIG. 12 is a schematic block diagram showing a constitution of the data sampling control unit 11 and the memory control unit 15 according to the second modification. FIG. 13A is an explanatory view showing operations of a sorting portion 113 in the data sampling unit 11 according to the second modification, FIG. 13B is an explanatory view showing operations of a first writing control portion 154*a* in a memory writing control portion 153', and FIG. 13C is an explanatory view showing operations of a second writing control portion 154b in the memory writing control portion 153'.

The data sampling control unit 11 of the second modification comprises the sorting portion 113, a first FIFO memory 115 and a second FIFO memory 117. When there is an input of the pixel data from the analog frontend IC 5, the pixel data corresponding to the pixel signal from the first sensor 31 is written to the first FIFO memory 115, and the pixel data corresponding to the pixel signal from the second sensor 33 is written to the second FIFO memory 117 by the operations of the sorting portion 113, as shown in FIG. 13A. Such a constitution is possible if the sorting portion 113 is provided with a counter and every time there is an input of pixel data, a value in the counter is incremented. With this counter, it is possible to distinguish, in the sorting portion 113, whether the pixel data is from the first sensor 31 or second sensor 33 based on the value in the counter.

The memory writing control portion 153' comprises the first writing control portion 154a and the second writing control portion 154b. The first writing control portion 154a reads out two pieces of pixel data from the first FIFO memory 115 when more than one pieces of pixel data are stored in the first FIFO memory 115, and writes the read pixel data to the area in the memory 23 corresponding to the destination memory address set in the address setting portion 157. At this point, the first writing control portion 154a, as shown in FIG. 13B, provides the memory 23 with byte enable signal "0101" via the memory access adjustment portion 151 to simultaneously access the memory areas (0x0501 and 0x0503 in the Figure) corresponding to the pixel positions of the two pieces of the pixel data, and writes the two pixel data in a lump to the memory 23.

The second writing control portion 154b reads out two pieces of pixel data from the second FIFO memory 117 when more than one pixel data is stored in the second FIFO memory 117, and writes the read pixel data to the area in the memory 23 corresponding to the destination memory address set in the address setting portion 157. At this point, the second writing control portion 154b, as shown in FIG. 13C, provides the memory 23 with byte enable signal "1010" via the memory access adjustment portion 151 to simultaneously access the memory areas (0x0a00 and 0x0a02 in the Figure) corresponding to the pixel positions of the two pieces of the pixel data, and writes the two pixel data in a lump to the memory 23.

The destination memory address can be set in the address setting portion 157 having the same constitution as in FIG. 10. In this case, the values in the respective additional value registers Ra1 to Ra3 and address registers Rc1 to Rc3 to be set by the CPU 13 have to be changed according to the writing conditions in the second modification. The update timing of the respective calculating units 63', 65', 67', the switching control of the selector 71, etc. have to be changed according to the writing timing of the memory writing control portion 153.

Also, three calculating units 63', 64', 67' are provided in FIG. 10. However, in the second modification, only the destination memory addresses for the pixel data in the first FIFO memory 115 and the pixel data in the second FIFO memory 117 have to be set. Therefore, the aforementioned operations can be realized by two calculating units 63', 65'.

Particularly, when the pixel data is outputted from the analog frontend IC 5 in the order shown in FIG. 8A, an initial value in the additional value register Ra1 is set to +4, and an initial value of the address register Rc1 is set to INIT−gap. Furthermore, an initial value of the additional value register Ra2 is set to +4, and the initial value of the address register Rc2 is set to INIT. In this manner, the values INIT−gap, INIT−gap+4, INIT−gap+8, . . . are sequentially set in the address register Rc1, the values INIT, INIT+4, INIT+8, . . . are set in the address register Rc2.

The image reading apparatus of the second modification allows writing of a plurality of pixel data in a lump. Thus, the access times to the memory can be reduced.

From now on, an image reading apparatus according to a third modification, which serves as the image processing apparatus of the present invention, is explained. The basic constitution of the apparatus is approximately the same as the aforementioned image reading apparatuses in the first embodiment and the second modification. Accordingly, the detailed descriptions of the same components are not repeated.

Figure 14:
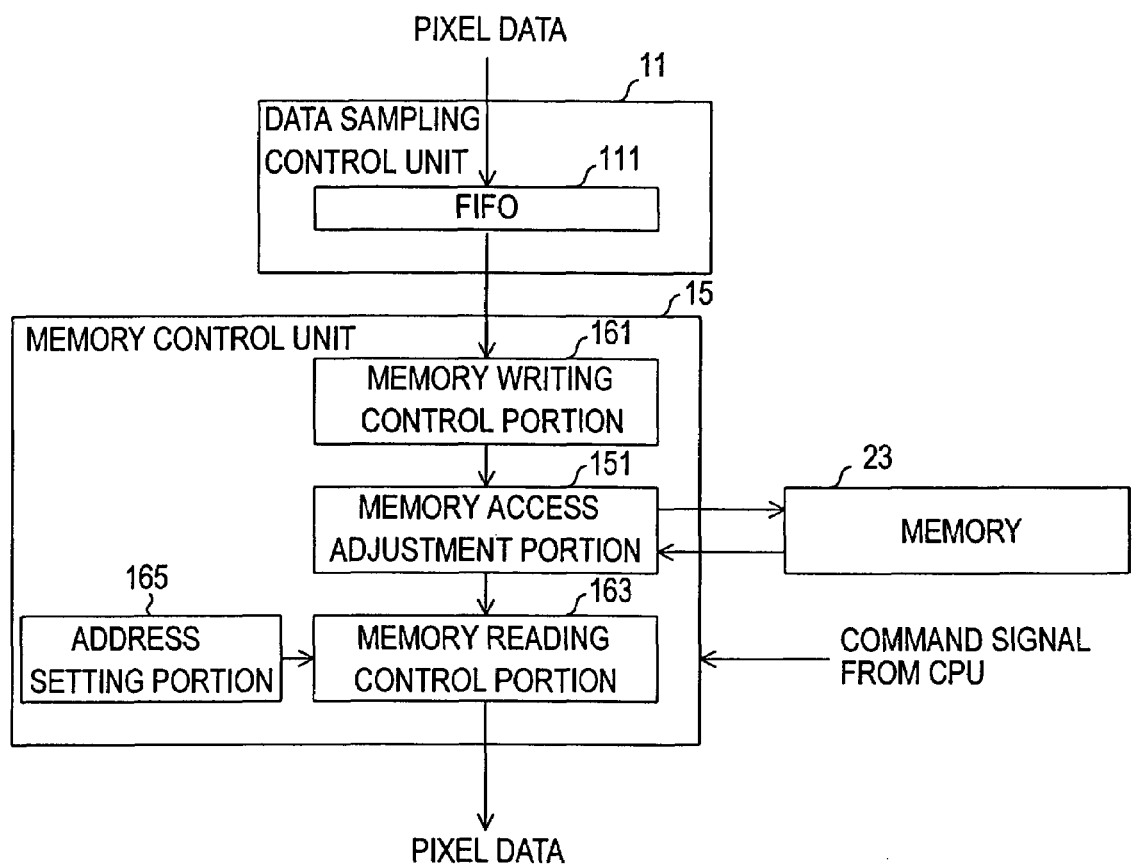
FIG. 14 is a schematic block diagram showing a constitution of the memory control unit according to a third modification.

FIG. 14 is a schematic block diagram showing a constitution of the memory control unit 15 according to the third modification.

A memory writing control unit 161 in the memory control unit 15, when it obtains the pixel data outputted from the analog frontend IC 5 via the data sampling control unit 11, sequentially writes the pixel data to the adjacent memory areas as shown in FIG. 15A. FIG. 15A is an explanatory view showing an arrangement of the pixel data written to the memory 23. As can be understood from FIG. 15A, as the respective pixel data are written to the adjacent memory areas sequentially by the memory writing control unit 161, they are stored in the memory 23 in the arrangement corresponding to the output, pattern of the pixel data from the analog frontend IC 5.

The memory reading control unit 163, when it receives a reading command from the CPU 13, accesses the area in the memory 23 corresponding to a source memory address set in the address setting unit 165 to read out the pixel data stored in the area, and outputs the pixel data to the external image forming apparatus 25 in the order corresponding to the pixel arrangement of an image to be formed by the image forming apparatus 25.

Particularly, the address setting unit 165 is constituted as shown in FIG. 10. FIG. 10 is an illustration of an internal constitution of the address setting portion 157. However, the address setting unit 165 in the third modification has the same basic constitution as the address setting portion 157 shown in FIG. 10. Therefore, the operations of the address setting unit 165 are explained by way of FIG. 10 as below.

Figure 16:
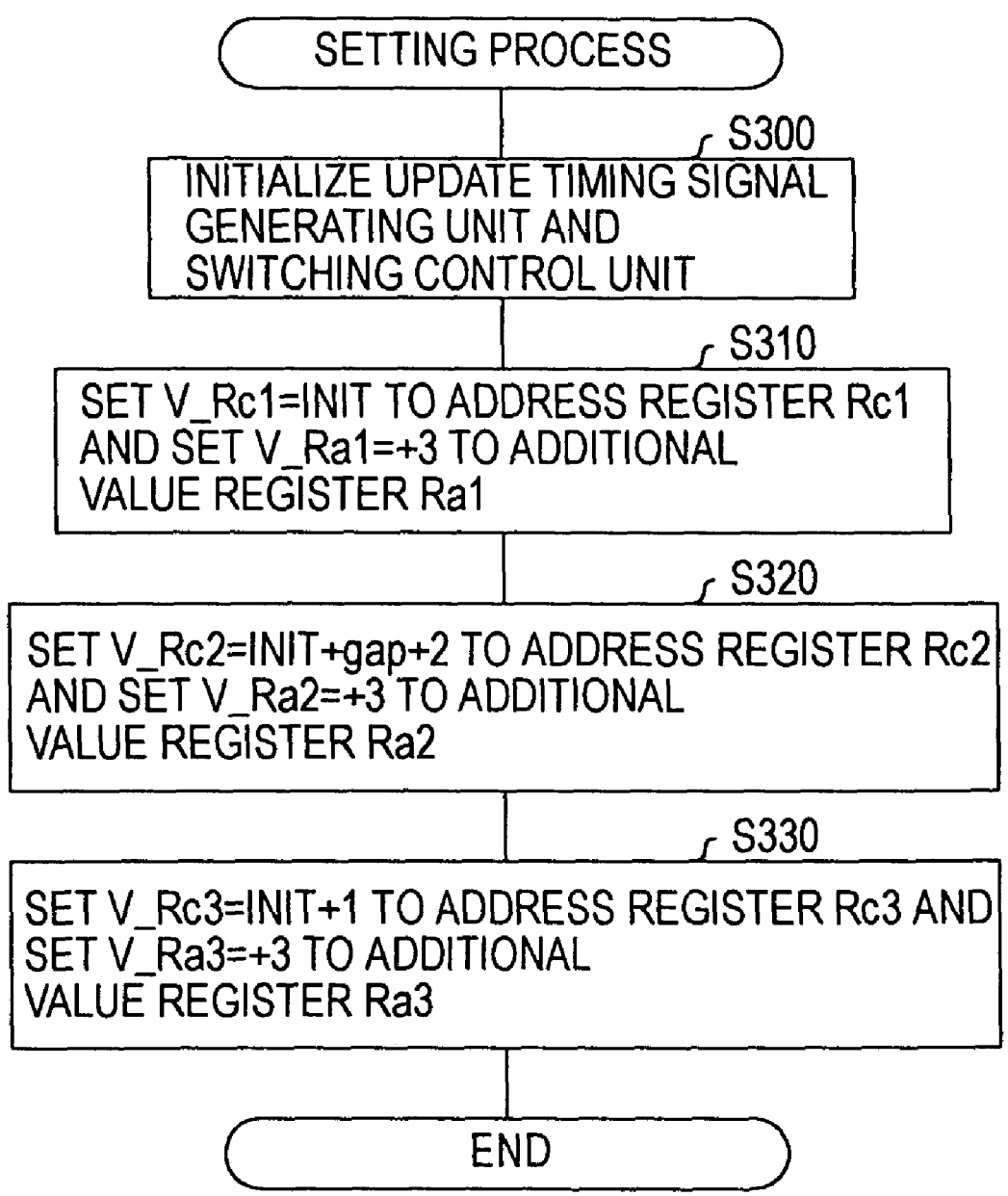
FIG. 16 is a flowchart showing a setting process of the third modification executed by the CPU to an address setting unit.

Various values are set to the respective registers Ra1 to Ra3, Rc1 to Rc3 in the address setting unit 165 by the setting process by the CPU 13 before the operations. FIG. 16 is a flowchart showing a setting process of the third modification performed to the address setting unit 165 by the CPU 13 in response to a reading command from the outside.

When the setting process shown in FIG. 16 is started, the CPU 13 initializes the update timing signal generating unit 61 and the switching control unit 73 in step S300. In step S310, it sets an initial value INIT corresponding to the source memory address of a first pixel position, and a value +3 to the additional value register Ra1. Subsequently, the CPU 13 sets a value INIT+gap+2 to the address register Rc2, and a value +3 to the additional value register Ra2 (S320). The CPU 13 sets a value INIT+1 to the address register Rc3, and a value +3 to the additional value register Ra3 (S330). Then, this setting process is ended.

When the values in the registers are set as above by the CPU 13, the first calculating unit 63' adds the value +3 set in the additional value register Ra1 to the initial value INIT (0x0500 in the Figure) in the address register Rc1 as shown in FIG. 15B, every time there is an input of the first update timing signal. As a result, the values INIT, INIT+3 (0x0503 in the Figure), INIT+6 (0x0506 in the Figure), . . . are set in the address register Rc1 sequentially.

The second calculating unit 65' adds the value +3 set in the additional value register Ra2 to the initial value INIT+gap+2 (0x0a02 in the Figure) in the address register Rc2, every time there is an input of the second update timing signal. As a result, the values INIT+gap+2, INIT+gap+5 (0x0a05 in the Figure), INIT+gap+8 (0x0a08 in the Figure), . . . are set in the address register Rc2 sequentially.

The third calculating unit 67' adds the value +2 set in the additional value register Ra3 to the initial value INIT +1 (0x0501 in the Figure) in the address register Rc3, every time there is an input of the third update timing signal. As a result, INIT+1, INIT+4 (0x0504 in the Figure), INIT+7 (0x0507 in the Figure), . . . are set in the address register Rc3 sequentially.

The selector 71 repeatedly selects the address register Rc1, address register Rc2, address register Rc3, address register Rc2 in this order under the control of the switching control unit 73, and the values set in the address registers Rc1 to Rc3 are provided to the address register RR in the address registering unit 69' to set the source memory address to INIT, INIT+gap+2, INIT+1, INIT+gap+5, INIT+3, INIT+gap+8, INIT+4 . . . sequentially.

The update timing signal generating unit 61 provides the update timing signal to the corresponding calculating units 63', 65', 67' before the same address registers Rc1 to Rc3 are reselected by the selector 71 based on the pixel processing timing signal received each time the reading of the pixel data is completed.

According to the image reading apparatus of the third modification, the address setting unit 165 after the above setting process (FIG. 16) by the CPU 13 sets the source memory address in the address register RR in such a way that the respective pixel data are read from the memory 23 in order of the arrangement of the pixel of the image read by the CCD image sensor 3 by the add operation based on the output pattern of the pixel data from the analog frontend IC 5. Therefore, the memory reading control unit 163 can output the pixel data in order of the pixel arrangement by reading the respective pixel data from the memory 23 storing the pixel data according to the address in the address register RR.

Accordingly, the image reading apparatus of the third modification, allows the external image forming apparatus 25 to form the image read by the CCD image sensor 3 as an image to be formed by the image forming apparatus 25 based on the pixel data, without sorting operation of the pixel data after the reading of the pixel data. As a result, in the present embodiment, it is possible to substantially reduce steps regarding the output of the pixel data to the image forming apparatus 25, and thus reduce the workload of the image reading apparatus.

In the above, the embodiments of the present invention are described. However, the data writing apparatus and image processing apparatus of the present invention should not be limited to the embodiments described above, and other modifications and variations may be possible without departing from the technical scope of the invention.

For instance, the address setting unit 165 can be constituted as shown in FIG. 6 to form an image reading apparatus which can read out the respective pixel data in order of the pixel arrangement of the image read by the CCD image sensor 3. In this case, the initial values of the additional value registers Ra1 to Ra3, Rb1 to Rb3 are set by the setting process by the CPU 13 in such a way that the address setting unit 165 sets the source memory addresses in order of the pixel arrangement of the pixel data.

In the above embodiments, various setting processes when the multiplexer 7 sequentially and repeatedly provides the pixel signal outputted from the amplifier 49 of the third channel, the amplifier 48 of the second channel, and the amplifier 47 of the first channel to the analog digital converter 9 are described. However, if the multiplexer 7 provides the pixel signals to the analog digital converter 9 sequentially in another pattern, the output pattern of the pixel data in the analog frontend IC 5 is also changed. Therefore, according to the output pattern, the values to be set in the address setting units 157, 165 have to be appropriately changed to realize the data writing apparatus or image processing apparatus of the present invention.

What is claimed is:

1. A data writing apparatus for converting pixel signals outputted from an image reading apparatus to pixel data as digital signals and for writing the pixel data to a data storage memory, the image reading apparatus comprising:

a first sensor including light receiving elements provided per pixel and arranged in a primary scanning direction;

a second sensor including light receiving elements provided per pixel, arranged in the primary scanning direction and disposed in parallel to and at a predetermined distance away from the first sensor in a secondary scanning direction;

a first outputting device that outputs respective pixel signals obtained from the respective light receiving elements constituting the first sensor in order of arrangement of the light receiving elements;

a second outputting device that outputs respective pixel signals obtained from the respective light receiving elements arranged at even-numbered positions among the light receiving elements constituting the second sensor in order of arrangement of the light receiving elements; and a third outputting device that outputs respective pixel signals obtained from the respective light receiving elements arranged at odd-numbered positions among the light receiving elements constituting the second sensor in order of arrangement of the light receiving elements, the data writing apparatus comprising:

a pixel data outputting device that converts the pixel signals outputted from the first, second and third outputting devices to the pixel data as digital signals and outputs the pixel data as a serial data stream in a predetermined pattern showing output order of the respective outputting devices;

a calculating device that repeats add and subtract operation to a predetermined initial value according to the output pattern of the pixel data from the pixel data outputting device to calculate pixel positions of the respective pixel data outputted from the pixel data outputting device;

an address setting device that sets destination memory addresses to write the pixel data outputted from the pixel data outputting device based on the calculation results by the calculating device; and a writing device that writes the pixel data outputted from the pixel data outputting device to areas in the data storage memory which correspond to the destination memory addresses set by the address setting device.

2. The data writing apparatus as set forth in claim 1 wherein said calculating device includes a difference calculating unit that calculates a difference between the pixel position of the pixel data to be outputted from said pixel data outputting device and the pixel position of the pixel data outputted last time, said address setting device includes an address storing unit that stores the destination memory address, and the address setting device updates the destination memory address based on the difference calculated by the difference calculating unit and the address stored in the address storing unit.

3. The data writing apparatus as set forth in claim 2 wherein said calculating device comprising:
   a first calculating unit that repeats add and subtract operation to a predetermined first initial value to sequentially calculate pixel positions of the pixel data corresponding to said pixel signals outputted from said first outputting device;
   a second calculating unit that repeats add and subtract operation to a predetermined second initial value to sequentially calculate pixel positions of the pixel data corresponding to said pixel signals outputted from said second outputting device; and
   a third calculating device that repeats add and subtract operation to a predetermined third initial value to sequentially calculate pixel positions of the pixel data corresponding to said pixel signals outputted from said third outputting device,
   the calculating device being designed to selectively output one of the calculation results by said first, second and third calculation units as a calculation result of the calculating device, depending on the output pattern of the pixel data from said pixel data outputting device.

4. The data writing apparatus as set forth in claim 2 wherein said writing device comprising:
   a first FIFO memory that stores the pixel data corresponding to the pixel signals obtained from said first sensor among the pixel data outputted from said pixel data outputting device; and
   a second FIFO memory that stores the pixel data corresponding to the pixel signals obtained from said second sensor among the pixel data outputted from the pixel data outputting device,
   the writing device being designed to be capable of writing a plurality of pixel data stored in the respective FIFO memories in a lump to said data storage memory.

5. The data writing apparatus as set forth in claim 4 wherein said writing device accesses the areas in said data storage memory which correspond to said destination memory addresses set by said address setting device using byte enable signal, and writes a plurality of pixel data in a lump to the areas.

6. An image processing apparatus for making an external image forming apparatus to form an image based on a group of pixel data written to a memory by an image reading apparatus, the image reading apparatus comprising:
   a first sensor including light receiving elements provided per pixel and arranged in a primary scanning direction;
   a second sensor including light receiving elements provided per pixel, arranged in the primary scanning direction and disposed in parallel to and at a predetermined distance away from the first sensor in a secondary scanning direction;
   a first outputting device that outputs respective pixel signals obtained from the respective light receiving elements constituting the first sensor in order of arrangement of the light receiving elements;
   a second outputting device that outputs respective pixel signals obtained from the respective light receiving elements arranged at even-numbered positions among the light receiving elements constituting the second sensor in order of arrangement of the light receiving elements;
   a third outputting device that outputs respective pixel signals obtained from the respective light receiving elements arranged at odd-numbered positions among the light receiving elements constituting the second sensor in order of arrangement of the light receiving elements;
   a pixel data outputting device that converts the pixel signals outputted from the first, second and third outputting devices to pixel data as digital signals and outputs the pixel data as a serial data stream in a predetermined pattern; and
   a writing device that sequentially writes the respective pixel data outputted from the pixel data outputting device to the memory,
   the image processing apparatus comprising a restoration outputting device that reads and outputs the respective pixel data from the memory in the order corresponding to pixel arrangement of the image to be formed by the external image forming apparatus based on the predetermined pattern of the pixel data output from the pixel data outputting device.

* * * * *